US012523363B2

(12) United States Patent
Snell et al.

(10) Patent No.: US 12,523,363 B2
(45) Date of Patent: Jan. 13, 2026

(54) EASILY-SERVICED AREA LIGHT

(71) Applicant: CREE LIGHTING USA LLC, Racine, WI (US)

(72) Inventors: Nathan R. Snell, Raleigh, NC (US); Mark P. Boomgaarden, Cary, NC (US); Kurt Schreib, Waukesha, WI (US); Corey Goldstein, Milwaukee, WI (US); Randall Levy Bernard, Conshohocken, PA (US)

(73) Assignee: CREE LIGHTING USA LLC, Racine, WI (US)

( * ) Notice: Subject to any disclaimer, the term of this patent is extended or adjusted under 35 U.S.C. 154(b) by 0 days.

(21) Appl. No.: 18/838,884

(22) PCT Filed: Feb. 18, 2022

(86) PCT No.: PCT/US2022/017027

§ 371 (c)(1),
(2) Date: Aug. 15, 2024

(87) PCT Pub. No.: WO2023/158437

PCT Pub. Date: Aug. 24, 2023

(65) Prior Publication Data

US 2025/0189111 A1 Jun. 12, 2025

(51) Int. Cl.

*F21V 23/00* (2015.01)
*F21V 15/01* (2006.01)

(Continued)

(52) U.S. Cl.

CPC ............ *F21V 23/008* (2013.01); *F21V 15/01* (2013.01); *F21V 17/107* (2013.01); *F21V 23/06* (2013.01);

(Continued)

(58) Field of Classification Search

CPC ...... F21V 23/008; F21V 15/01; F21V 17/107; F21V 23/06; F21V 29/74; F21V 31/005; F21W 2131/10; F21Y 2115/10

See application file for complete search history.

(56) References Cited

U.S. PATENT DOCUMENTS

| | | | | |
|---|---|---|---|---|
| 5,871,272 A * | 2/1999 | Sharrah | F21L 4/027 | |
| | | | 362/228 | |
| 2008/0310145 A1* | 12/2008 | Blake | F21V 21/084 | |
| | | | 362/105 | |

(Continued)

OTHER PUBLICATIONS

International Search Report and Written Opinion corresponding to PCT/US22/17027, mailed Nov. 16, 2022, 20 pages.

*Primary Examiner* — Evan P Dzierzynski

(74) *Attorney, Agent, or Firm* — J. Clinton Wimbish; Maynard Nexsen PC

(57) ABSTRACT

A modular and easily serviced area light is provided. Area lights described herein use a modular fixture design to facilitate in-field serviceability and upgradeability of power, lighting, sensor, and other components. In particular, light fixtures include a housing with an integrated hinge to provide access to sub-assemblies and electrical components without removal of doors, access panels, or other large fixture parts. In this manner, various components can be easily serviced or upgraded, including power circuitry (e.g., light-emitting diode (LED) drivers and/or power converters) and a light engine (e.g., to provide a larger LED array). At least some components may be accessed for service without need for specialty or any tools. In addition, sub-components, such as a power outlet (e.g., a NEMA-rated outdoor receptacle), a sensor, etc., can be installed in-field without needing to replace main fixture components.

20 Claims, 23 Drawing Sheets

(51) Int. Cl.

| | |
|---|---|
| ***F21V 17/10*** | (2006.01) |
| ***F21V 23/06*** | (2006.01) |
| ***F21V 29/74*** | (2015.01) |
| ***F21V 31/00*** | (2006.01) |
| *F21W 131/10* | (2006.01) |
| *F21Y 115/10* | (2016.01) |

(52) U.S. Cl.

CPC ............ *F21V 29/74* (2015.01); *F21V 31/005* (2013.01); *F21W 2131/10* (2013.01); *F21Y 2115/10* (2016.08)

(56) References Cited

U.S. PATENT DOCUMENTS

| | | | | |
|---|---|---|---|---|
| 2014/0226339 | A1* | 8/2014 | Kinnune | F21V 29/505 362/294 |
| 2015/0260362 | A1* | 9/2015 | Koga | H05B 45/00 362/362 |
| 2019/0017667 | A1* | 1/2019 | Mitchell | F21V 29/713 |
| 2019/0072258 | A1 | 3/2019 | Tan | |
| 2019/0341793 | A1* | 11/2019 | Chien | F21V 33/0004 |
| 2020/0116340 | A1* | 4/2020 | Nikooyan | F21V 21/04 |
| 2020/0132264 | A1* | 4/2020 | Scarlata | F21S 8/033 |
| 2020/0363042 | A1* | 11/2020 | Jeswani | F21S 8/026 |
| 2020/0383181 | A1* | 12/2020 | Pearse | F21K 9/238 |
| 2021/0045485 | A1* | 2/2021 | Shoulders | A42B 3/04 |
| 2021/0180782 | A1* | 6/2021 | Brunelli | F21S 9/02 |

* cited by examiner 10a
20f
18a, 18b 14c
16

10a
20e
18a, 18b 14b
16

10a
20d
18a, 18b 14b
16

10a
20c
18a, 18b 14a
16

10a
20a, 20b
18a, 18b 14a
16

EASILY-SERVICED AREA LIGHT

RELATED APPLICATION DATA

This application is a U.S. National Phase of PCT/US22/17027 filed Feb. 18, 2022, which is incorporated herein by reference in its entirety.

FIELD OF THE DISCLOSURE

The present disclosure relates to light fixtures and, more particularly, to light fixtures using light-emitting diodes (LEDs).

BACKGROUND

In recent years, the use of light-emitting diodes (LEDs) in development of light fixtures for various common lighting purposes has increased, and this trend has accelerated as advances have been made in the field. Indeed, lighting applications which previously had typically been served by fixtures using what are known as high-intensity discharge (HID) lamps are now being served by LED light fixtures. Such lighting applications include, among a good many others, roadway lighting, factory lighting, parking lot lighting, and commercial building lighting.

High-luminance light fixtures using LED modules as a light source present certain challenges. One particular challenge for high-luminance LED light fixtures relates to serviceability. In many applications, LED modules are not as interchangeable as their legacy counterparts, such as HID lamps. In addition, for outdoor or wet locations, additional sealing of components may be required which has traditionally resulted in LED fixtures which are more difficult to service in the field.

SUMMARY

An easily-serviced area light is provided. Area lights described herein use a modular fixture design to facilitate in-field serviceability and upgradeability of power, lighting, sensor, and other components. In particular, light fixtures include a housing with an integrated hinge to provide access to sub-assemblies and electrical components without removal of doors, access panels, or other large fixture parts. In this manner, various components can be easily serviced or upgraded, including power circuitry (e.g., light-emitting diode (LED) drivers and/or power converters) and a light engine (e.g., to provide a larger LED array). At least some components may be accessed for service without need for specialty or any tools. In addition, sub-components, such as a power outlet (e.g., a NEMA-rated outdoor receptacle), a sensor, etc., can be installed in-field without needing to replace main fixture components.

An exemplary embodiment provides a light fixture. The light fixture includes a main fixture housing enclosing power circuitry for at least one light emitter, wherein the main fixture housing is configured to be mounted to a structure. The light fixture further includes a weather-sealed light engine comprising the at least one light emitter, wherein the light engine is pivotably connected to the main fixture housing and moveable with respect to the power circuitry to provide service access thereto while the light engine remains secured with respect to the main fixture housing.

Another exemplary embodiment provides a light fixture. The light fixture includes a fixture housing enclosing power circuitry and a light-emitting arrangement operatively connected to the power circuitry and remaining movably secured with respect to the fixture housing while providing service access to the power circuitry.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1B:
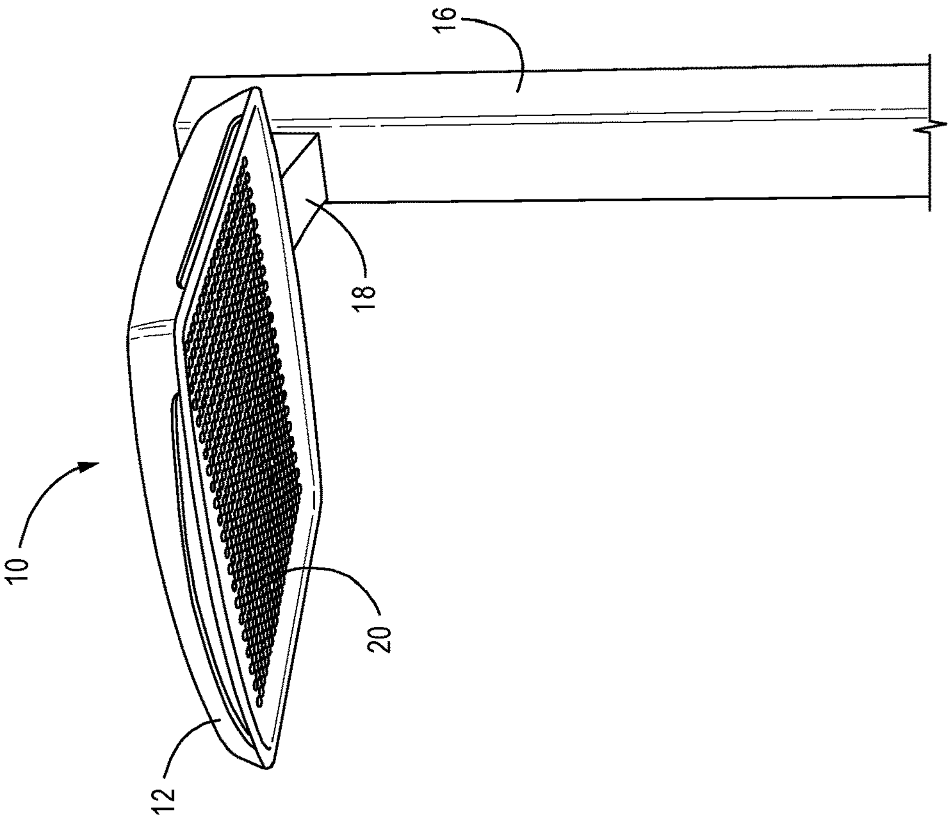
FIG. 1B is a bottom isometric view of the pole-mounted light fixture of FIG. 1A.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

A modular and easily serviced area light is provided. Area lights described herein use a modular fixture design to facilitate in-field serviceability and upgradeability of power, lighting, sensor, and other components. In particular, light fixtures include a housing with an integrated hinge to provide access to sub-assemblies and electrical components without removal of doors, access panels, or other large fixture parts. In this manner, various components can be easily serviced or upgraded, including power circuitry (e.g., light-emitting diode (LED) drivers and/or power converters) and a light engine (e.g., to provide a larger LED array). At least some components may be accessed for service without need for specialty or any tools. In addition, sub-components, such as a power outlet (e.g., a NEMA-rated outdoor receptacle), a sensor, etc., can be installed in-field without needing to replace main fixture components.

I. Modular Light Fixture and Components

Figure 1A:
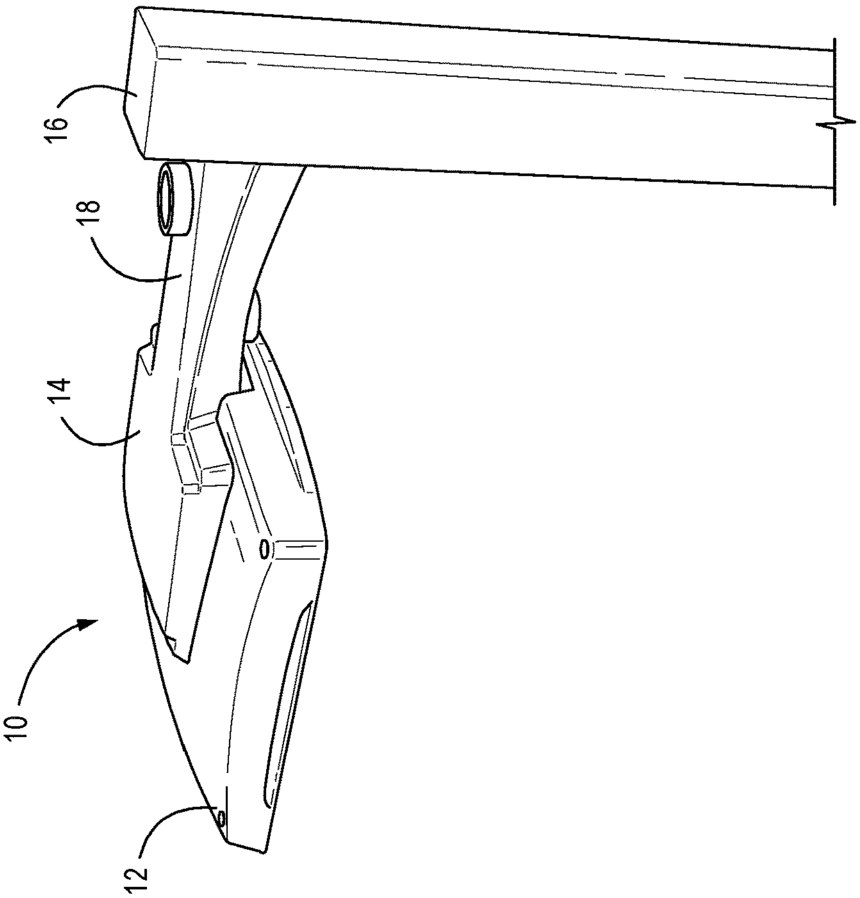
FIG. 1A is a top isometric view of a pole-mounted light fixture according to embodiments described herein.

FIG. 1A is a top isometric view of a pole-mounted light fixture 10 according to embodiments described herein. The light fixture 10 includes an optical assembly 12 and a main fixture housing 14. The light fixture 10 is designed to mount to a pole 16 or other structure to provide area lighting, flood lighting, pathway lighting, and so on, without the need for separately designed fixtures. In this regard, the light fixture 10 is modular and can be attached to numerous types of structures for different lighting applications using one or more different mounting adapters 18. In addition, the modular design of the light fixture 10 described herein provides for improved in-field serviceability as will be described further below.

FIG. 1B is a bottom isometric view of the pole-mounted light fixture 10 of FIG. 1A. The optical assembly 12 includes a light engine 20 having an array of LEDs which emit light outward from the optical assembly 12 (e.g., downward in the illustrated example). In an exemplary aspect, the light fixture 10 is designed for outdoor and/or wet locations. Accordingly, one or more components of the light fixture 10 are weather-sealed, such as the light engine 20 and/or a compartment of the main fixture housing 14.

A. Light Fixture Components

Figure 2:
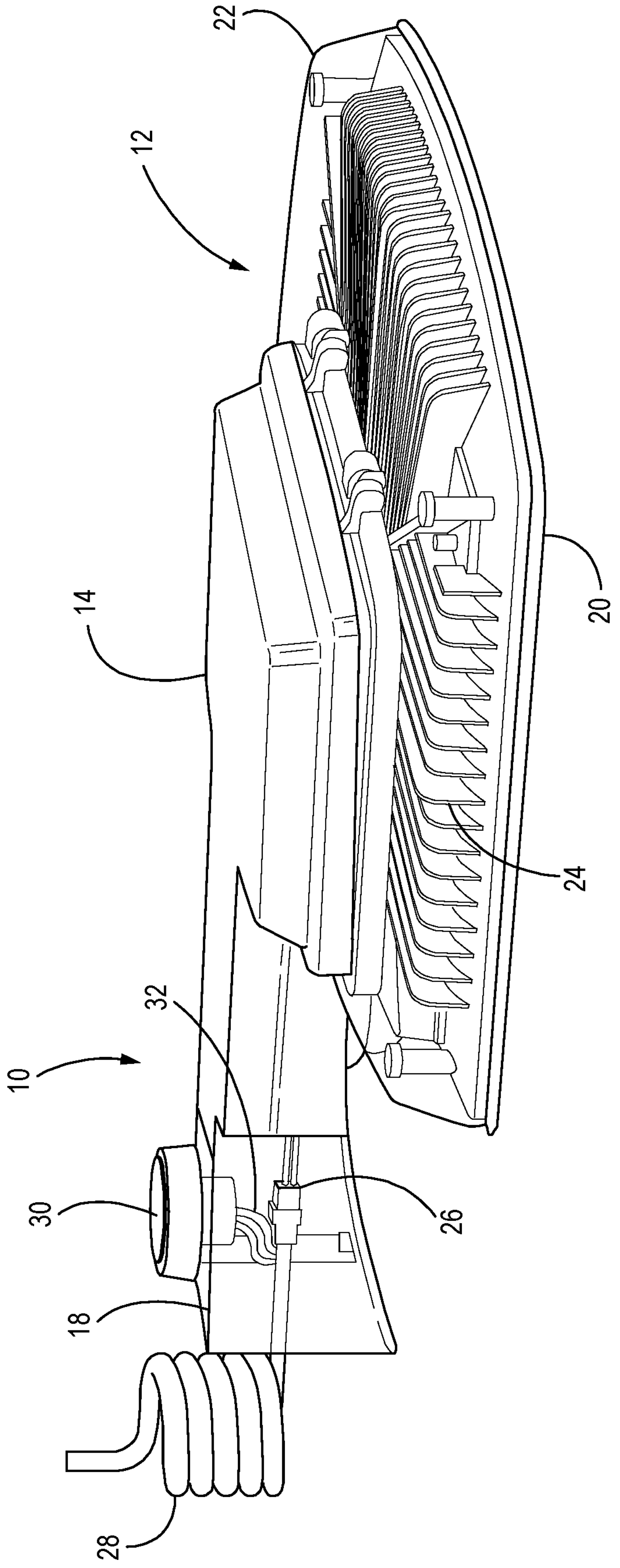
FIG. 2 is a schematic diagram of an exemplary embodiment of the light fixture of FIG. 1A.

FIG. 2 is a schematic diagram of an exemplary embodiment of the light fixture 10 of FIG. 1A. The light fixture 10 is modular, such that various components can be easily serviced, replaced, and/or upgraded. For example, the optical assembly 12 is pivotably connected to the main fixture housing 14 such that components in the main fixture housing 14 are serviceable without detaching the light engine 20.

The optical assembly 12 includes the light engine 20 and a cowling 22. The cowling 22 is attached to the light engine 20 and defines a thermal passage between the cowling 22 and a heat sink 24. In one aspect, the heat sink 24 provides structural rigidity for the optical assembly 12, and the cowling 22 is attached to the heat sink 24. In addition, the optical assembly 12 may be attached to the main fixture housing 14 via the heat sink 24.

The main fixture housing 14 attaches to a mounting adapter 18, which facilitates installation of the light fixture 12 on a structure, such as the pole 16 of FIGS. 1A and 1B, a building, a canopy, a ground mount, etc. In some embodiments, the light fixture 10 may be considered to include the mounting adapter 18. In other embodiments, the light fixture 10 and mounting adapter 18 are separate apparatuses.

The main fixture housing 14 houses power circuitry and other electronic components for the light fixture 10. As such, a fixture connector 26 provides an electrical connection to mains power (e.g., an alternating current (AC) line voltage). In one aspect, the mounting adapter 18 provides the mains power via a mains power conductor 28 which connects to the fixture connector 26. In some embodiments, the mounting adapter 18 may optionally include an outdoor power outlet 30, which connects to the mains power conductor 28 via an outlet connector 32.

Figure 3:
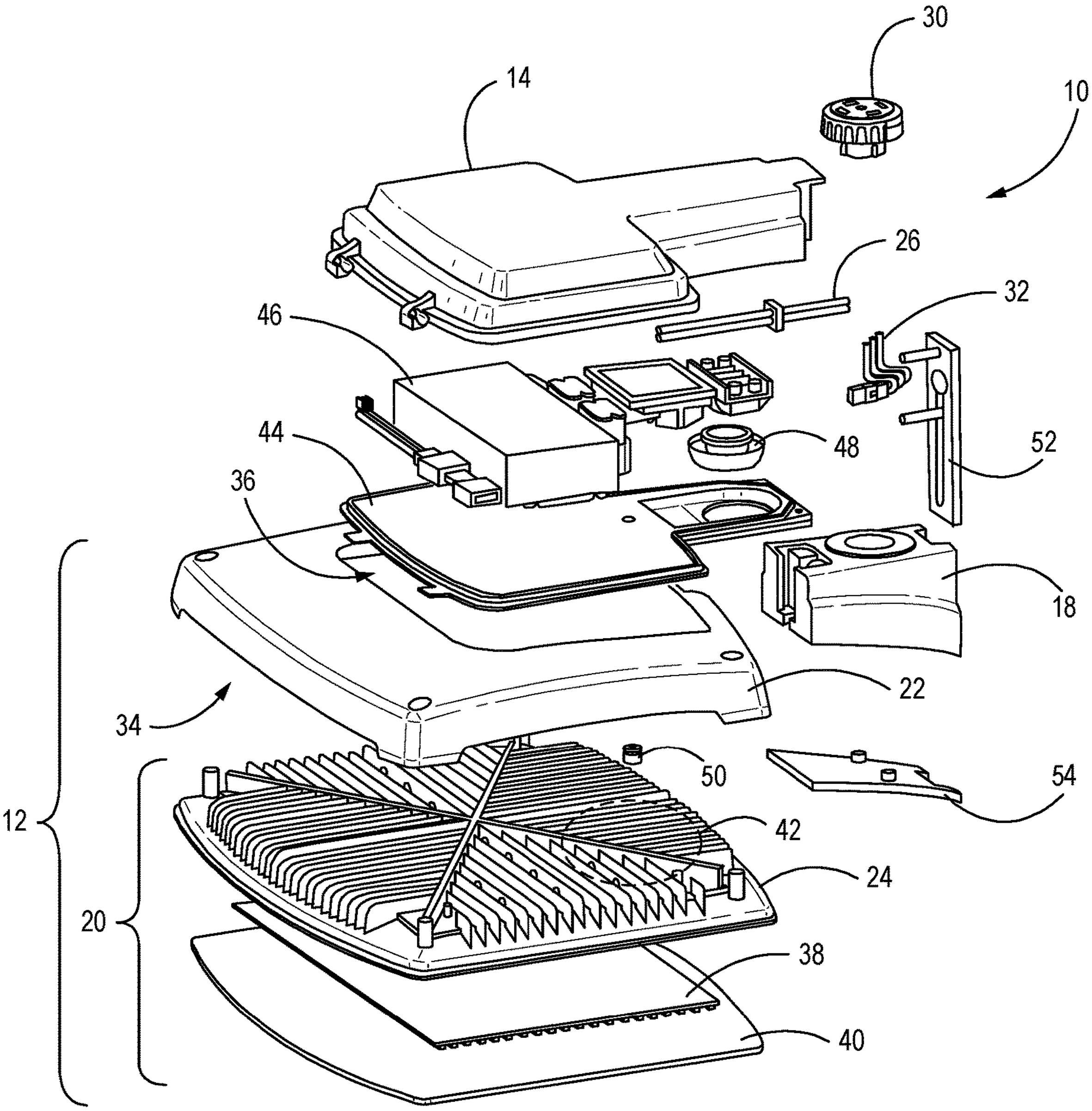
FIG. 3 is an exploded view of the light fixture of FIG. 2.

FIG. 3 is an exploded view of the light fixture 10 of FIG. 2. The optical assembly 12 includes the light engine 20 and a cowling 22 attached to the light engine 20. The cowling 22 includes one or more thermal intake openings 34 and thermal exhaust openings 36 to facilitate air flow across the heat sink 24. The thermal intake opening(s) 34 are at a bottom edge of the cowling 22 and the thermal exhaust opening(s) 36 are at a top edge of the cowling 22 to facilitate heat extraction from the heat sink 24.

The light engine 20 emits light via at least one LED module 38 comprising an array of LED light sources. The LED module 38 is enclosed by the heat sink 24 and a lens 40. The LED module 38 is further thermally coupled to the heat sink 24. The heat sink 24 is a heat-conductive structure which includes an LED-supporting bottom surface and a top portion with a plurality of heat-dissipating surfaces 42, which may be in the form of fins extending outward from a center of the heat sink 24. The thermal intake opening(s) 34 and thermal exhaust opening(s) 36 in the cowling 22 direct air flow to and along the heat-dissipating surfaces 42.

The main fixture housing 14 includes an upper portion and a bottom cover 44 (e.g., a lower portion), which define a compartment enclosing components for driving the light engine 20, such as power circuitry 46, one or more sensors 48, and control circuitry. For example, an ambient light sensor 48 may be housed within the main fixture housing 14 (e.g., and at least partially disposed in the bottom cover 44) to control activation of the light engine 20. In an exemplary aspect, the compartment defined by the main fixture housing 14 and bottom cover 44 is weather-sealed to protect the power circuitry 46 and other components. In addition, as will be further illustrated below, the bottom cover 44 may be attached to the light engine 20 such that the power circuitry 46 is serviceable without detaching the light engine 20 from the light fixture 10. The main fixture housing 14 may further be sealed using grommets 50 or other appropriate means, such as at a connection to the light engine 20 and at the fixture connector 26.

The mounting adapter 18 may be weather-sealed or not, according to a desired application. As described above, the mounting adapter 18 includes a mains power conductor 28 to connect the fixture connector 26 to mains power and may optionally include an outdoor power outlet 30 and outlet connector 32. The mounting adapter 18 is configured to mount to a structure. In some embodiments, the mounting adapter 18 mates with a mounting bracket 52 to attach to the structure. A mounting adapter cover 54 may facilitate installation and allow access to the fixture connector 26 and outdoor power outlet 30 for servicing.

Figure 4:
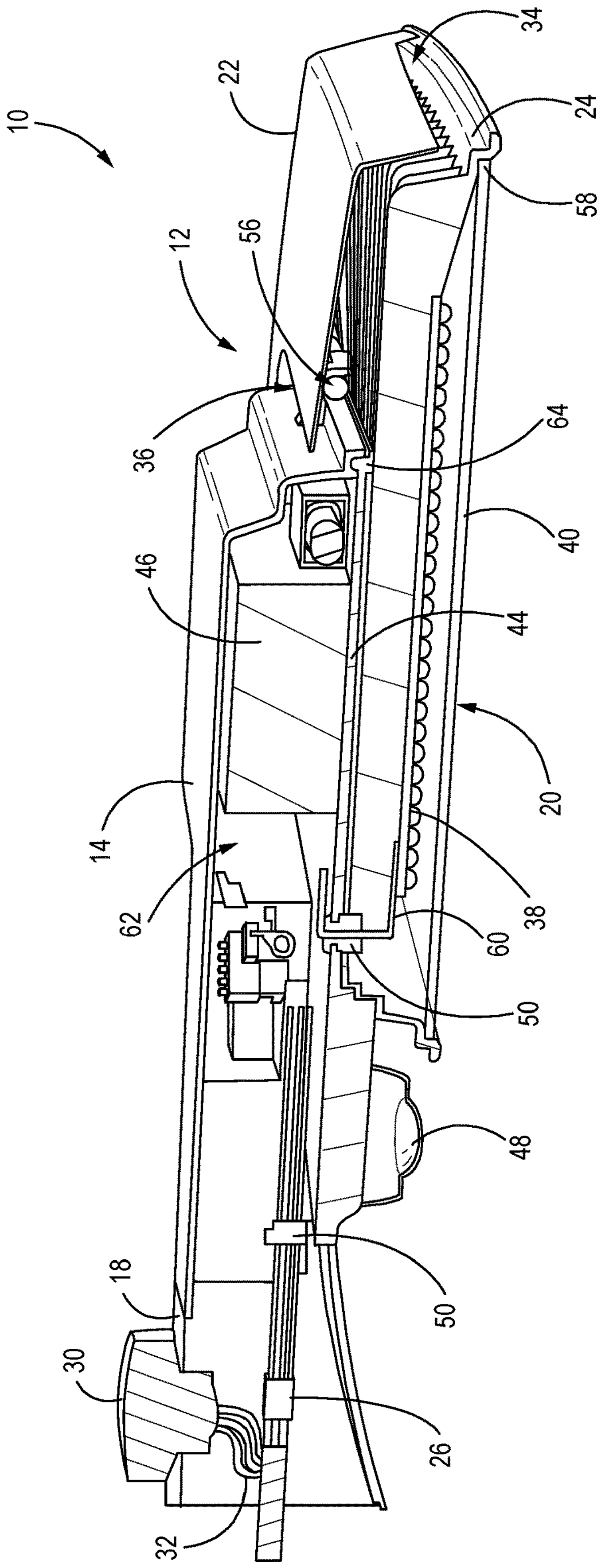
FIG. 4 is a cross-sectional view of the light fixture of FIG. 2.

FIG. 4 is a cross-sectional view of the light fixture 10 of FIG. 2. The optical assembly 12 is pivotably attached to the main fixture housing 14, such as with a hinge 56. This makes the power circuitry 46 and other components in the main fixture housing 14 serviceable without detaching the light engine 20. The hinge 56 may include a first hinge component attached to the light engine 20 (e.g., formed on the heat sink 24) and a second hinge component attached to the main fixture housing 14 (e.g., formed on an outer surface of the main fixture housing 14).

In one aspect, the light fixture 10 is an outdoor and/or wet-location fixture. Accordingly, certain components of the light fixture 10 are weather-sealed, such as the light engine 20 and the main fixture housing 14. With regard to the light engine 20, the LED module 38 is weather-sealed between the heat sink 24 and the lens 40. The lens 40 may be sealed via a gasket, adhesive, or other appropriate means at a shaped edge 58 of the heat sink 24. The LED module 38 is electrically connected to the power circuitry 46 via a module connector 60. A grommet 50 about the module connector 60 can ensure the LED module 38 remains sealed from liquids and other elements.

The bottom cover 44 provides a weather-sealed compartment 62 within the main fixture housing 14. A gasket 64 facilitates this seal while allowing the bottom cover 44 to open as the light engine 20 pivots downward via the hinge 56. In addition, the grommets 50 about the module connector 60 and the fixture connector 26 maintain the seal when the bottom cover 44 is secured to the main fixture housing 14.

B. Modular Mounting Adapter

Figure 5C:
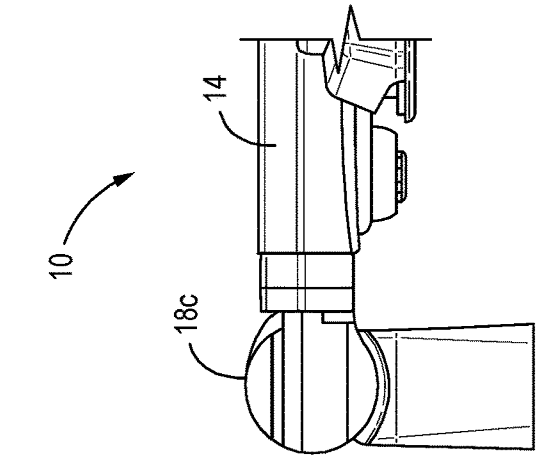
FIG. 5C is a side view of an exemplary adjustable mounting adapter for the light fixture of FIGS. 2-4.
Figure 5B:
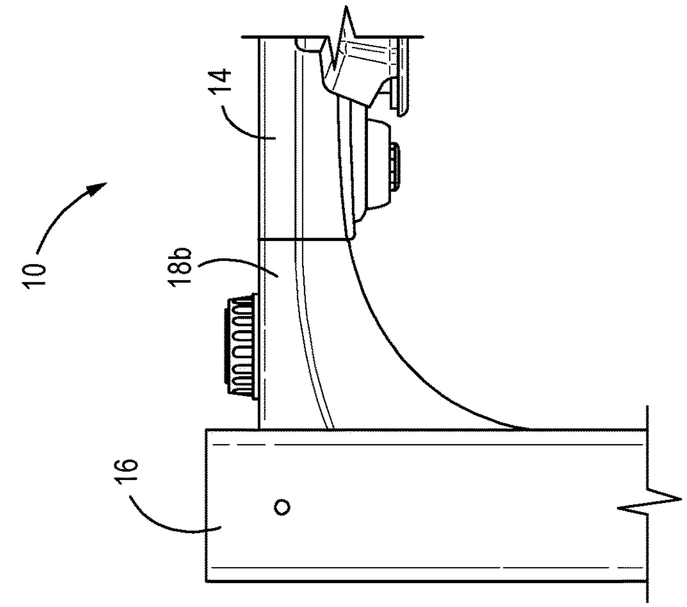
FIG. 5B is a side view of an exemplary large pole mounting adapter for the light fixture of FIGS. 2-4.
Figure 5A:
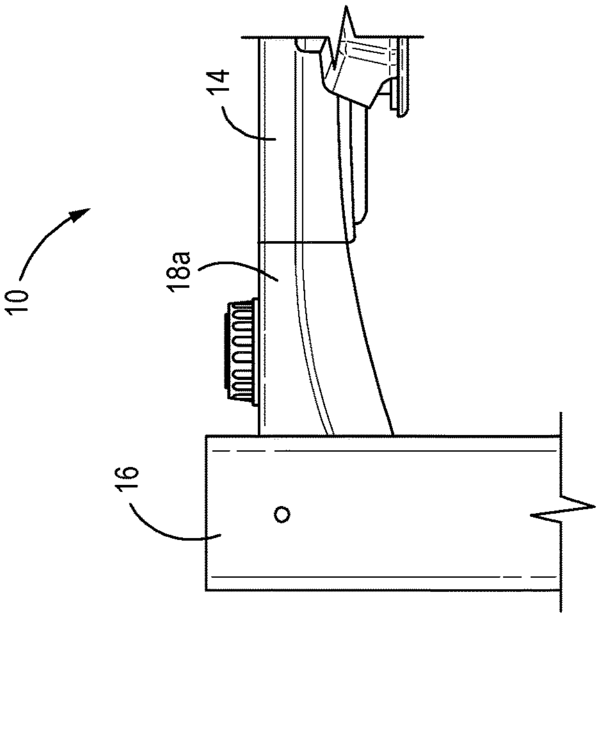
FIG. 5A is a side view of an exemplary small pole mounting adapter for the light fixture of FIGS. 2-4.

FIG. 5A is a side view of an exemplary small pole mounting adapter 18*a* for the light fixture 10 of FIGS. 2-4. The small pole mounting adapter 18*a* may be appropriate to support smaller embodiments of the light fixture 10. The small pole mounting adapter 18*a* can be attached to a pole or similar structure to provide a secure mounting point and electrical connection for the main fixture housing 14.

FIG. 5B is a side view of an exemplary large pole mounting adapter 18*b* for the light fixture 10 of FIGS. 2-4. The large pole mounting adapter 18*b* may be appropriate to support larger embodiments of the light fixture 10 and/or mounting in locations subject to greater external forces. The small pole mounting adapter 18*a* and large pole mounting adapter 18*b* are interchangeable, such that the light fixture 10 can be replaced without needing to change the mounting adapter 18*a*, 18*b* or the mounting adapter 18*a*, 18*b* can be replaced without needing to change the light fixture 10.

FIG. 5C is a side view of an exemplary adjustable mounting adapter 18*c* for the light fixture 10 of FIGS. 2-4. The adjustable mounting adapter 18*c* may be appropriate for mounting the light fixture 10 in different orientations, such as a flood light, uplight, canopy light, or other application. Thus, each of the mounting adapters 18*a* to 18*c* is replaceable with another mounting adapter 18*a* to 18*c* configured for mounting to a different type of structure and/or in a different orientation.

Figure 6A:
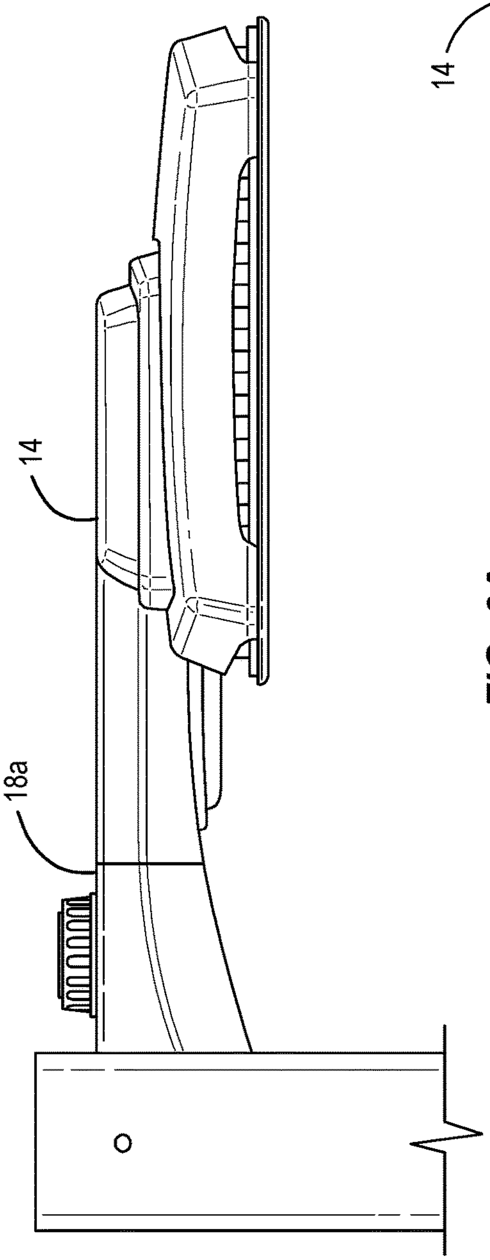
FIG. 6A is a side view of the pole-mounted light fixture of FIG. 1A using the small pole mounting adapter of FIG. 5A.
Figure 6B:
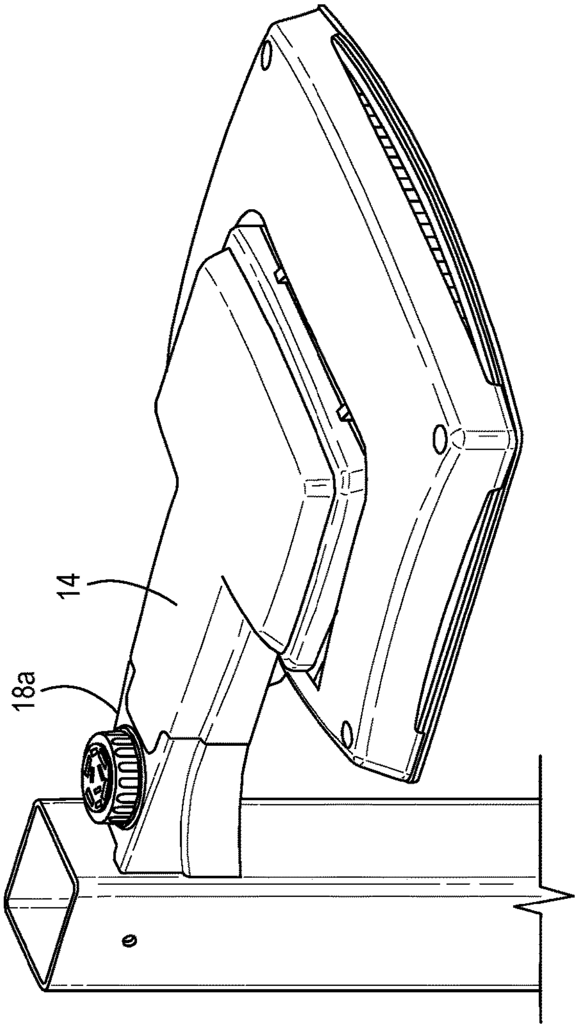
FIG. 6B is an isometric view of the pole-mounted light fixture of FIG. 1A using the small pole mounting adapter of FIG. 5A.
Figure 6C:
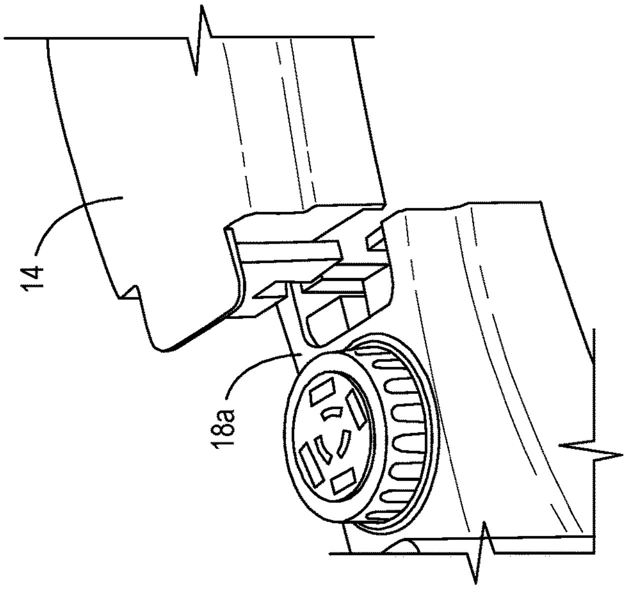
FIG. 6C illustrates attachment of the light fixture of FIGS. 2-4 to the small pole mounting adapter of FIG. 5A.

FIG. 6A is a side view of the pole-mounted light fixture 10 of FIG. 1A using the small pole mounting adapter 18*a* of FIG. 5A. FIG. 6B is an isometric view of the pole-mounted light fixture 10 of FIG. 1A using the small pole mounting adapter 18*a* of FIG. 5A. FIG. 6C illustrates attachment of the light fixture 10 of FIGS. 2-4 to the small pole mounting adapter 18*a* of FIG. 5A. The main fixture housing 14 and the small pole mounting adapter 18*a* have a keyhole-type interlocking structure to facilitate ease of installation and service.

Figure 7A:
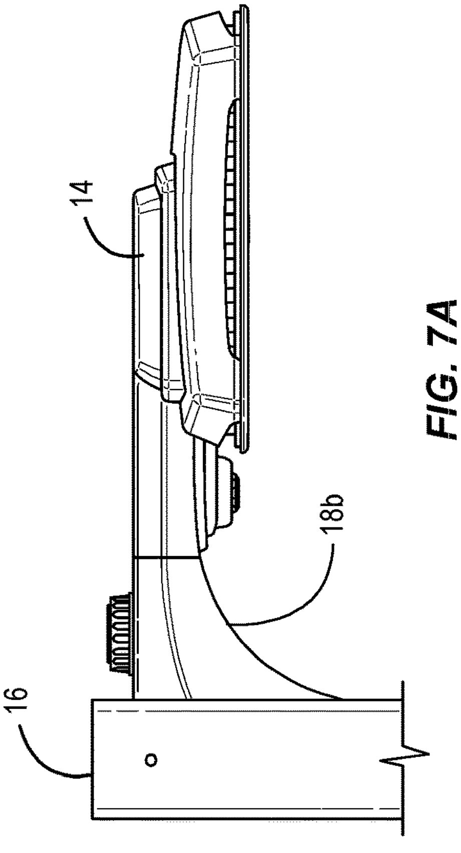
FIG. 7A is a side view of the pole-mounted light fixture of FIG. 1A using the large pole mounting adapter of FIG. 5B.
Figure 7B:
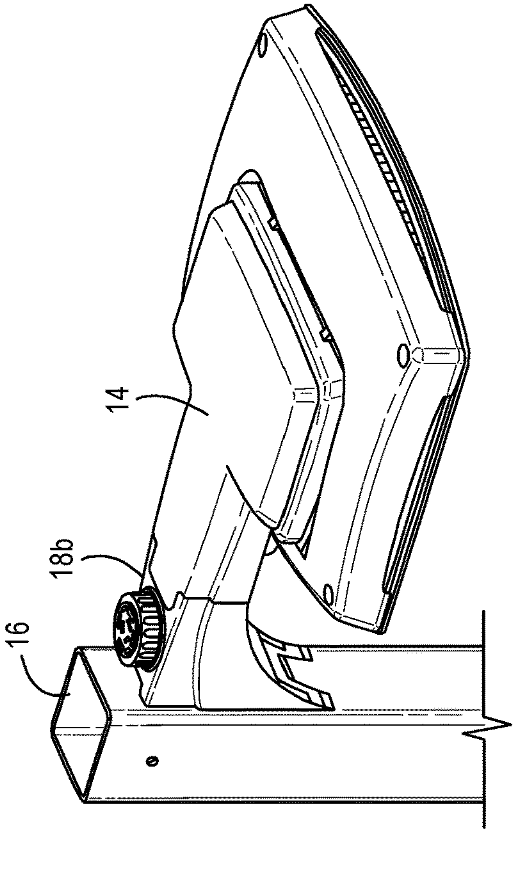
FIG. 7B is an isometric view of the pole-mounted light fixture of FIG. 7A.

FIG. 7A is a side view of the pole-mounted light fixture 10 of FIG. 1A using the large pole mounting adapter 18*b* of FIG. 5B. FIG. 7B is an isometric view of the pole-mounted light fixture 10 of FIG. 7A.

Figure 8A:
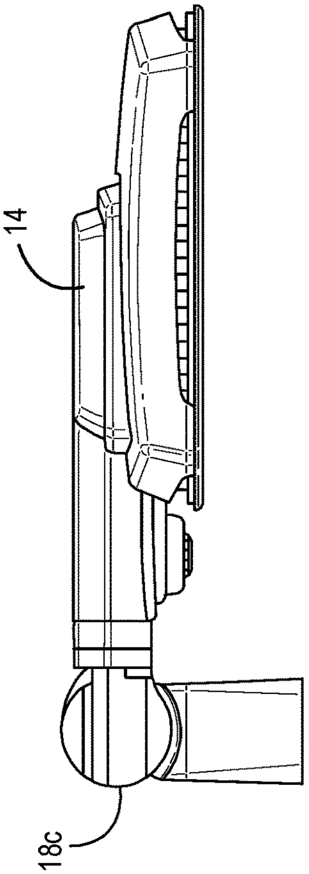
FIG. 8A is a side view of the light fixture of FIGS. 2-4 mounted to a structure with the adjustable mounting adapter of FIG. 5C.
Figure 8B:
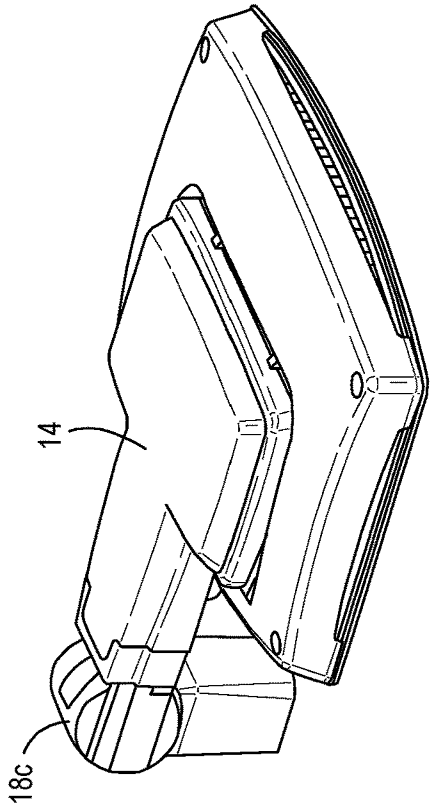
FIG. 8B is an isometric view of the light fixture of FIG. 8A.

FIG. 8A is a side view of the light fixture 10 of FIGS. 2-4 mounted to a structure with the adjustable mounting adapter 18*c* of FIG. 5C. FIG. 8B is an isometric view of the light fixture 10 of FIG. 8A.

C. Modular Light Engine and Main Fixture Housing

According to embodiments described herein, the light fixture 10 has a modular design such that various components are interchangeable and/or easily serviced or replaced. For example, the light fixture 10 supports multiple sizes of light engines 20, as illustrated in FIGS. 9A-9F. In this manner, a given light engine 20 is replaceable with a larger or smaller light engine 20 (or one having a different light intensity, color, power, etc.) without needing to replace the main fixture housing 14.

Figure 9A:
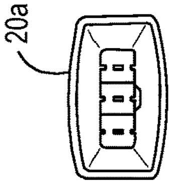
FIG. 9A is a bottom view of an exemplary super-small light engine of the light fixture of FIGS. 2-4.
Figure 9B:
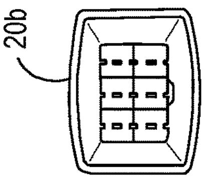
FIG. 9B is a bottom view of an exemplary small light engine of the light fixture of FIGS. 2-4.
Figure 9C:
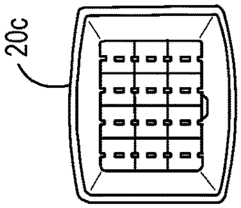
FIG. 9C is a bottom view of an exemplary medium light engine of the light fixture of FIGS. 2-4.
Figure 9D:
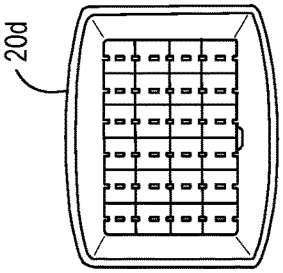
FIG. 9D is a bottom view of an exemplary large light engine of the light fixture of FIGS. 2-4.
Figure 9E:
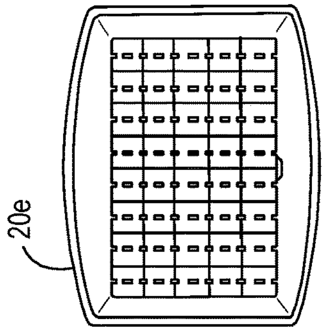
FIG. 9E is a bottom view of an exemplary extra-large light engine of the light fixture of FIGS. 2-4.
Figure 9F:
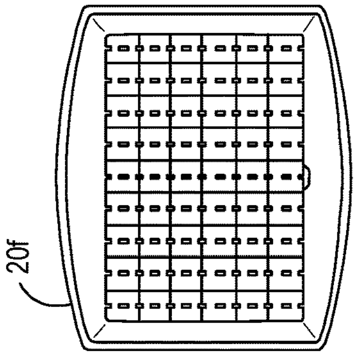
FIG. 9F is a bottom view of an exemplary super-large light engine of the light fixture of FIGS. 2-4.

FIG. 9A is a bottom view of an exemplary super-small light engine 20*a* of the light fixture 10 of FIGS. 2-4. FIG. 9B is a bottom view of an exemplary small light engine 20*b* of the light fixture 10 of FIGS. 2-4. FIG. 9C is a bottom view of an exemplary medium light engine 20*c* of the light fixture 10 of FIGS. 2-4. FIG. 9D is a bottom view of an exemplary large light engine 20*d* of the light fixture 10 of FIGS. 2-4. FIG. 9E is a bottom view of an exemplary extra-large light engine 20*e* of the light fixture 10 of FIGS. 2-4. FIG. 9F is a bottom view of an exemplary super-large light engine 20*f* of the light fixture 10 of FIGS. 2-4.

Figure 10A:
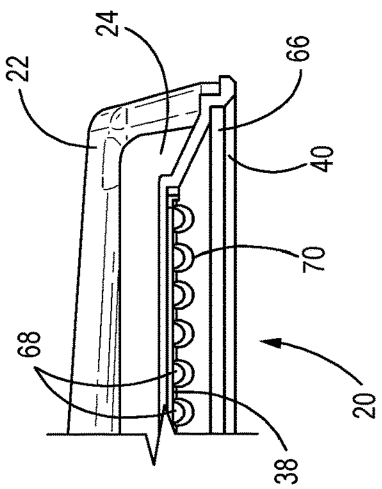
FIG. 10A is a cross-sectional view of a light engine according to any of the embodiments of FIGS. 9A-9F.
Figure 10B:
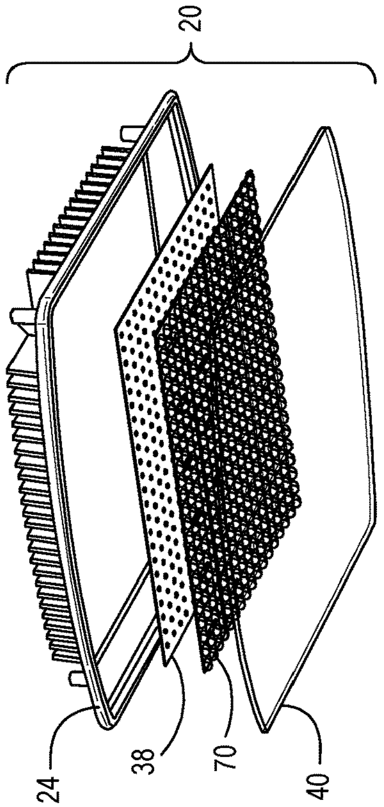
FIG. 10B is an exploded view of the light engine of FIG. 10A.

FIG. 10A is a cross-sectional view of a light engine 20 according to any of the embodiments of FIGS. 9A-9F. FIG. 10B is an exploded view of the light engine 20 of FIG. 10A. The light engine 20 includes the LED module 38, which is mechanically and thermally coupled to the heat sink 24. A lens seal 66 (e.g., a gasket, adhesive, etc.) provides a weather-resistant seal between the lens 40 and the heat sink 24. The lens 40 may be formed of a transparent or translucent material and may be clear or diffuse. The LED module 38 includes an array of LEDs 68 disposed on a substrate, such as a printed circuit board (PCB) or flexible circuit board. In some embodiments, an optic assembly 70 is attached to the LED module 38, to diffuse or otherwise direct light emitted by the array of LEDs 68.

Figure 11C:
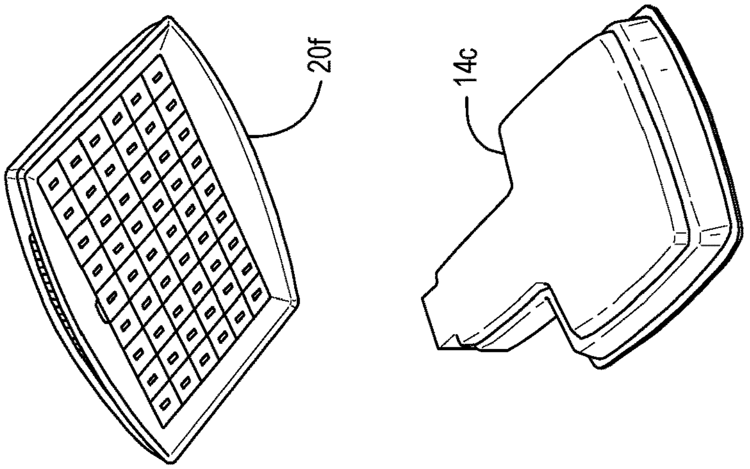
FIG. 11C illustrates a super-large fixture housing for the super-large light engine.
Figure 11B:
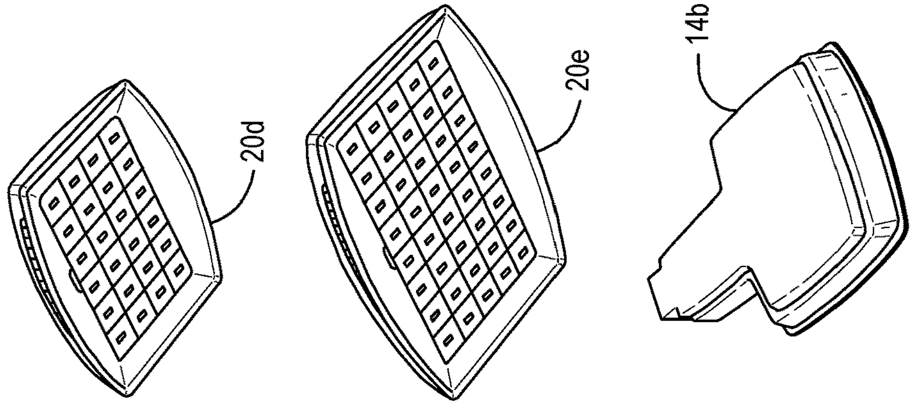
FIG. 11B illustrates a large fixture housing for the large light engine or extra-large light engine.
Figure 11A:
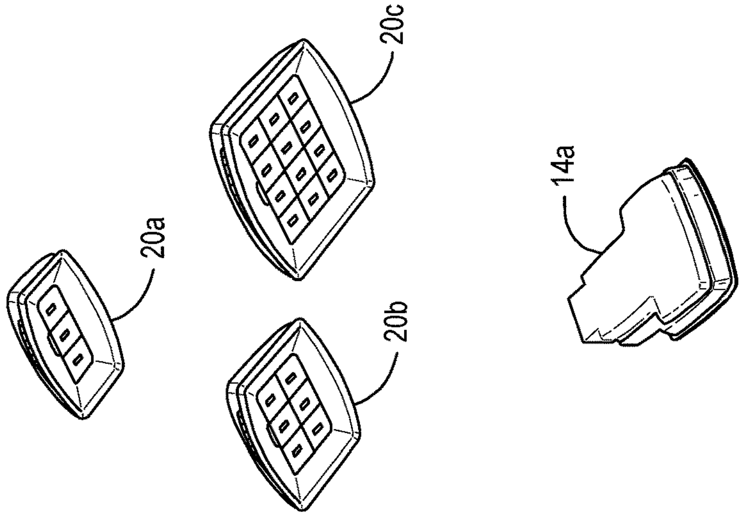
FIG. 11A illustrates a small fixture housing for the super-small light engine, small light engine, or medium light engine.

FIG. 11A illustrates a small fixture housing 14*a* for the super-small light engine 20*a*, small light engine 20*b*, or medium light engine 20*c*. FIG. 11B illustrates a large fixture housing 14*b* for the large light engine 20*d* or extra-large light engine 20*e*. FIG. 11C illustrates a super-large fixture housing 14*c* for the super-large light engine 20*f*. In one aspect, one main fixture housing 14*a* to 14*c* can support multiple sizes of light engine 20*a* to 20*f*. This is further illustrated with respect to FIGS. 12A-12D.

Figure 12A:
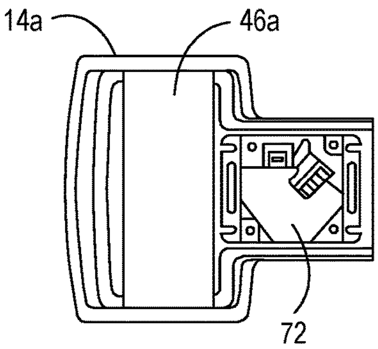
FIG. 12A is an open bottom view of the small fixture housing with small power circuitry for powering the super-small light engine, small light engine, or medium light engine.

FIG. 12A is an open bottom view of the small fixture housing 14*a* with small power circuitry 46*a* for powering the super-small light engine 20*a*, small light engine 20*b*, or medium light engine 20*c*. The small fixture housing 14*a* may enclose the small power circuitry 46*a* and control circuitry 72. The small power circuitry 46*a*, in turn, may support multiple sizes of light engine 20*a* to 20*c*. As such, the super-small light engine 20*a* is replaceable with another of the same size, a small light engine 20*b*, or a medium light engine 20*c* without needing to replace the small fixture housing 14*a* or the small power circuitry 46*a*. In some embodiments, the small power circuitry 46*a* may not support the power loads of each of the super-small light engine 20*a*, small light engine 20*b*, or medium light engine 20*c*, but may be replaceable with appropriate power circuitry having the same or a similar footprint as the small power circuitry 46*a*.

Figure 12B:
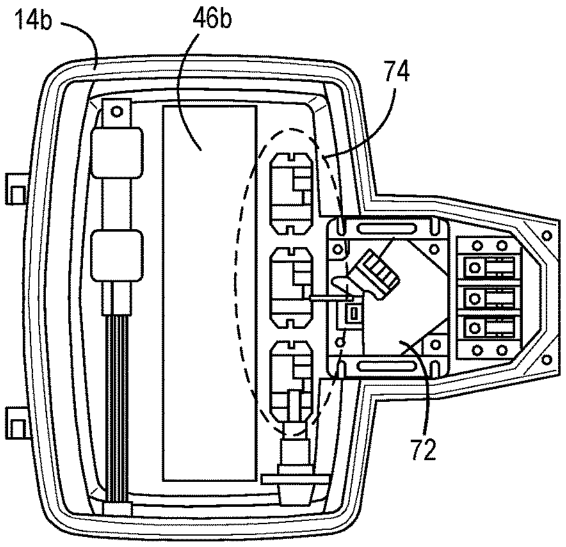
FIG. 12B is an open bottom view of the large fixture housing with large power circuitry for powering the large light engine or extra-large light engine.
Figure 12C:
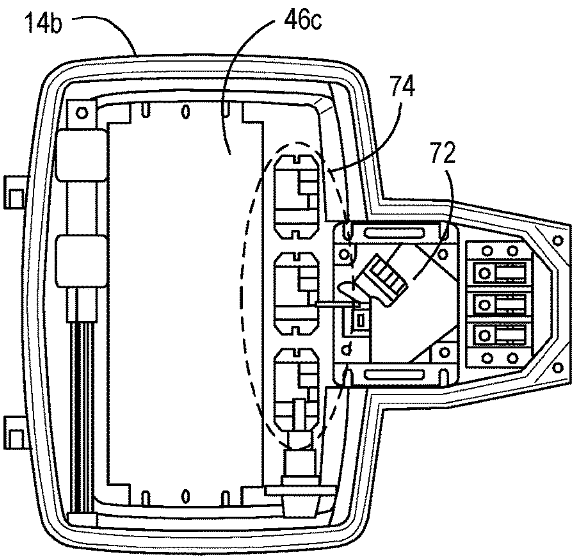
FIG. 12C is an open bottom view of the large fixture housing with extra-large power circuitry for powering the large light engine or extra-large light engine.

FIG. 12B is an open bottom view of the large fixture housing 14*b* with large power circuitry 46*b* for powering the large light engine 20*d* or extra-large light engine 20*e*. FIG. 12C is an open bottom view of the large fixture housing 14*b* with extra-large power circuitry 46*c* for powering the large light engine 20*d* or extra-large light engine 20*e*. The large fixture housing 14*b* may enclose the small power circuitry 46*a*, the control circuitry 72, one or more sensor circuits 74, and additional components. In some embodiments, the large power circuitry 46*b* can support multiple sizes of light engine 20*d*, 20*e*. In other embodiments, the extra-large power circuitry 46*c* may be needed, such as to support higher power light engines 20*d*, 20*e*.

Figure 12D:
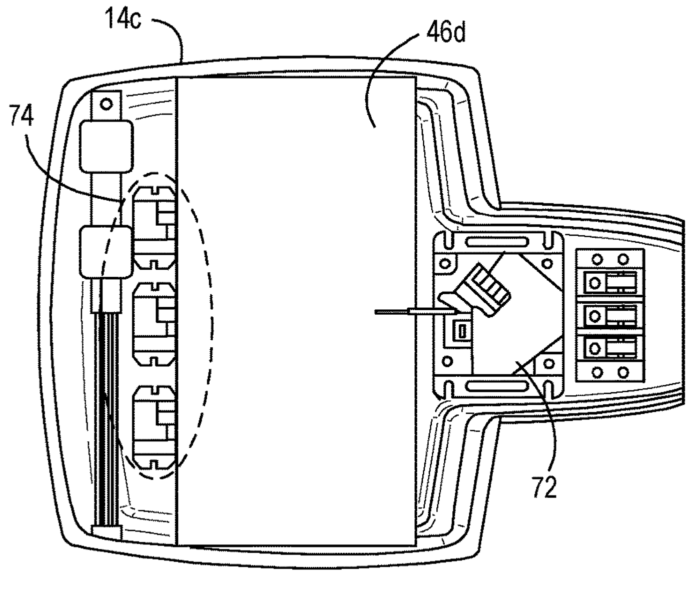
FIG. 12D is an open bottom view of the large fixture housing with super-large power circuitry for powering the super-large light engine.

FIG. 12D is an open bottom view of the super-large fixture housing 14*c* with super-large power circuitry 46*d* for powering the super-large light engine 20*f*. The super-large fixture housing 14*c* may enclose the super-large power circuitry 46*d*, the control circuitry 72, one or more sensor circuits 74, and additional components. In some examples, the super-large fixture housing 14*c* and super-large power circuitry 46*d* support other sizes of light engines, such as the smaller light engines 20*a* to 20*e*.

D. Optional Features

As described above, the light fixture 10 may optionally include an outdoor power outlet 30 disposed on an outer surface, which may be integrated with the light fixture 10 or installed in-field. For example, the outdoor power outlet 30 may be integrated in the mounting adapter 18, or the mounting adapter 18 may include an opening for later installation of the outdoor power outlet 30. In some embodiments, the outdoor power outlet 30 is otherwise integrated into the light fixture 10, such as in a separate compartment of the main fixture housing 14 from the power circuitry 46. In an exemplary aspect, the outdoor power outlet 30 is an outdoor-rated NEMA receptacle (e.g., as defined under the ANSI C136 standard), which may provide electrical and mechanical interconnection for power and/or control.

In addition, the main fixture housing 14 may optionally accommodate one or more sensors 48 and sensor circuits 74, such as ambient light sensors, occupancy sensors, image sensors, and other environmental sensors. These sensors may control an aspect of the operation of the light engine 20, such as to activate the LED module 38, deactivate the LED module 38, adjust an intensity level or color of emitted light, and so on.

Figure 13A:
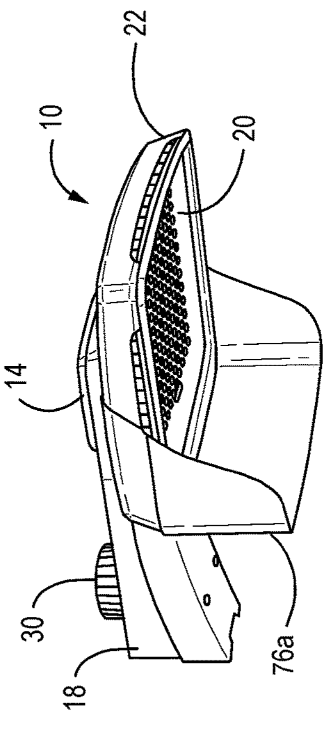
FIG. 13A is a bottom isometric view of the light fixture of FIGS. 2-4 with an exemplary backlight shield.
Figure 13B:
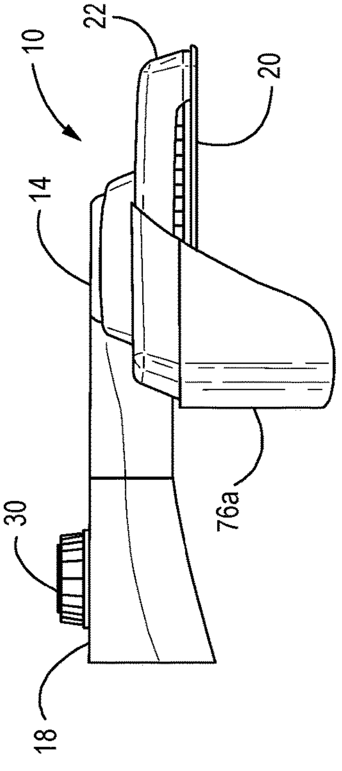
FIG. 13B is a side view of the light fixture of FIG. 13A.
Figure 13C:
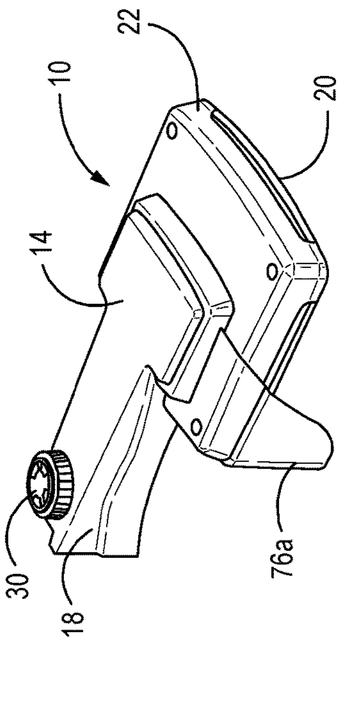
FIG. 13C is a top isometric view of the light fixture of FIG. 13A.

FIG. 13A is a bottom isometric view of the light fixture 10 of FIGS. 2-4 with an exemplary backlight shield 76*a*. FIG. 13B is a side view of the light fixture 10 of FIG. 13A. FIG. 13C is a top isometric view of the light fixture 10 of FIG. 13A. The backlight shield 76*a* may control light spillage from the light fixture 10 and may be integrated into or removable from the cowling 22.

Figure 14A:
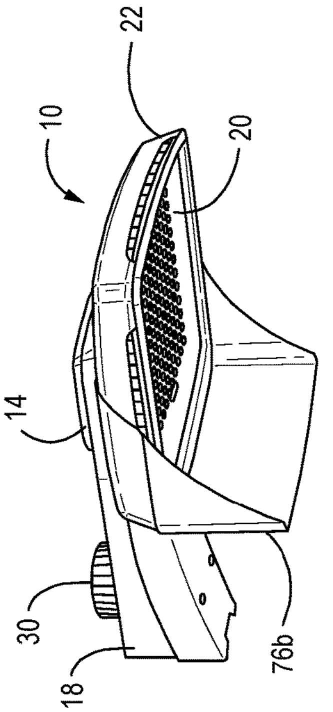
FIG. 14A is a bottom isometric view of the light fixture of FIGS. 2-4 with another exemplary backlight shield.
Figure 14B:
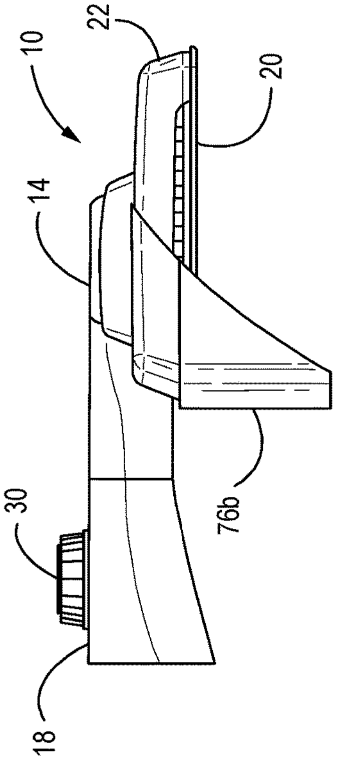
FIG. 14B is a side view of the light fixture of FIG. 14A.
Figure 14C:
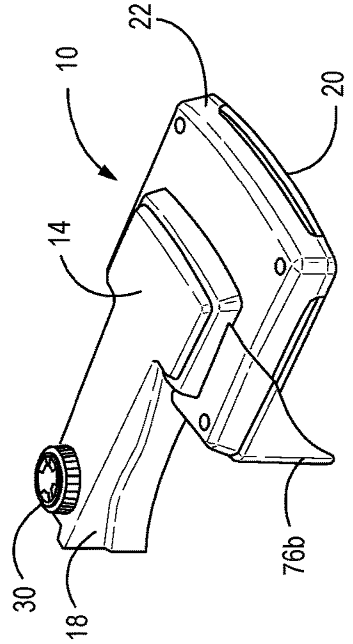
FIG. 14C is a top isometric view of the light fixture of FIG. 14A.

FIG. 14A is a bottom isometric view of the light fixture 10 of FIGS. 2-4 with another exemplary backlight shield 76*b*. FIG. 14B is a side view of the light fixture 10 of FIG. 14A. FIG. 14C is a top isometric view of the light fixture 10 of FIG. 14A. The backlight shield 76*b* may provide a different light distribution according to application.

II. Area and Flood Light Embodiments

Figure 15:
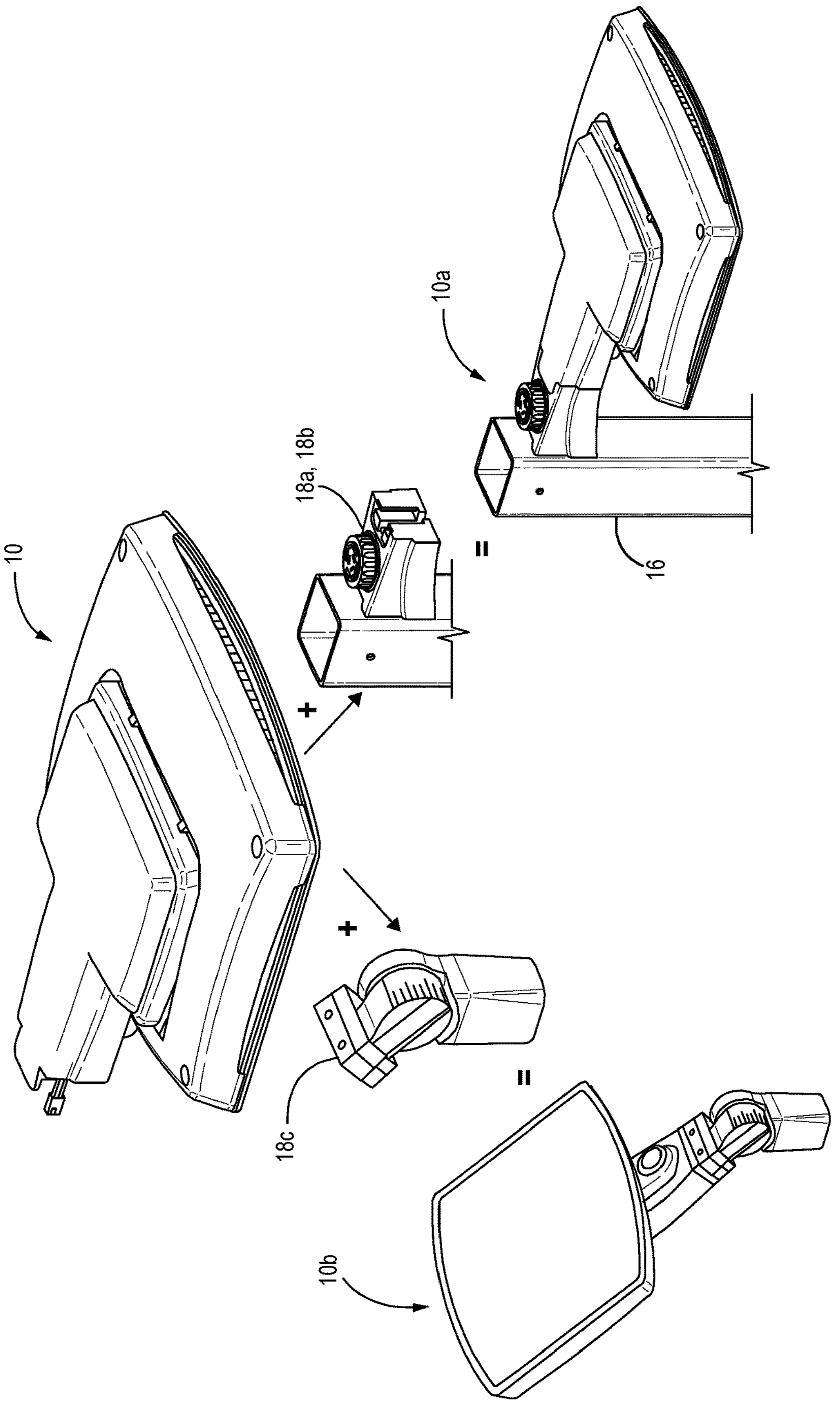
FIG. 15 is a schematic diagram of the light fixture of FIGS. 2-4 which can be mounted in a first orientation via a pole mounting adapter or a second orientation via an adjustable mounting adapter.

FIG. 15 is a schematic diagram of the light fixture 10 of FIGS. 2-4 which can be mounted in a first orientation via a pole mounting adapter 18*a*, 18*b* or a second orientation via an adjustable mounting adapter 18*c*. The modular light fixture 10 described herein can be mounted for various applications through these and other mounting adapters 18*a* to 18*c*. For example, the pole mounting adapter 18*a*,18*b* may be used for a pole-mounted application while the adjustable mounting adapter 18*c* may be used for a flood light application.

A. Pole-Mounted Fixtures

Figures 16A, 16B, 16C, 17A, 17B, 17C, 18A, 18B, 18C, 19A, 19B, 19C, 20A, 20B, 20C:
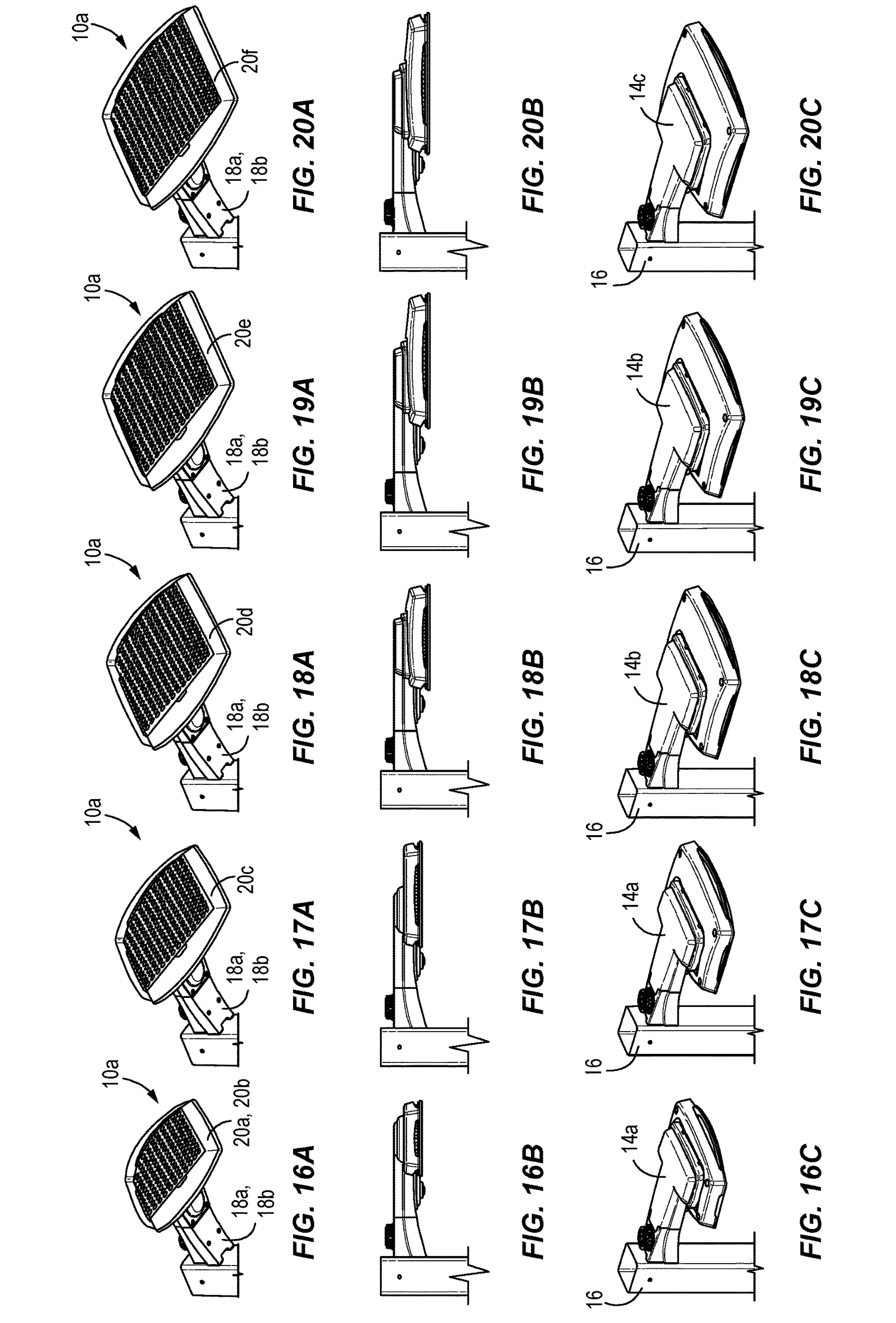
FIG. 16A is a bottom isometric view of a light fixture with the super-small light engine of FIG. 9A or the small light engine of FIG. 9B mounted with the pole mounting adapter of FIGS. 5A and 5B.
FIG. 16B is a side view of the light fixture of FIG. 16A.
FIG. 16C is a top isometric view of the light fixture of FIG. 16A.
FIG. 17A is a bottom isometric view of a light fixture with the medium light engine of FIG. 9C mounted with the pole mounting adapter of FIGS. 5A and 5B.
FIG. 17B is a side view of the light fixture of FIG. 17A.
FIG. 17C is a top isometric view of the light fixture of FIG. 17A.
FIG. 18A is a bottom isometric view of a light fixture with the large light engine of FIG. 9D mounted with the pole mounting adapter of FIGS. 5A and 5B.
FIG. 18B is a side view of the light fixture of FIG. 18A.
FIG. 18C is a top isometric view of the light fixture of FIG. 18A.
FIG. 19A is a bottom isometric view of a light fixture with the extra-large light engine of FIG. 9E mounted with the pole mounting adapter of FIGS. 5A and 5B.
FIG. 19B is a side view of the light fixture of FIG. 19A.
FIG. 19C is a top isometric view of the light fixture of FIG. 19A.
FIG. 20A is a bottom isometric view of a light fixture with the super-large light engine of FIG. 9F mounted with the pole mounting adapter of FIGS. 5A and 5B.
FIG. 20B is a side view of the light fixture of FIG. 20A.
FIG. 20C is a top isometric view of the light fixture of FIG. 20A.

FIG. 16A is a bottom isometric view of a light fixture 10*a* with the super-small light engine 20*a* of FIG. 9A or the small light engine 20*b* of FIG. 9B mounted with the pole mounting adapter 18*a*, 18*b* of FIGS. 5A and 5B. FIG. 16B is a side view of the light fixture 10*a* of FIG. 16A. FIG. 16C is a top isometric view of the light fixture 10*a* of FIG. 16A.

FIG. 17A is a bottom isometric view of a light fixture 10*a* with the medium light engine 20*c* of FIG. 9C mounted with the pole mounting adapter 18*a*, 18*b* of FIGS. 5A and 5B. FIG. 17B is a side view of the light fixture 10*a* of FIG. 17A. FIG. 17C is a top isometric view of the light fixture 10*a* of FIG. 17A.

FIG. 18A is a bottom isometric view of a light fixture 10*a* with the large light engine 20*d* of FIG. 9D mounted with the pole mounting adapter 18*a*, 18*b* of FIGS. 5A and 5B. FIG. 18B is a side view of the light fixture 10*a* of FIG. 18A. FIG. 18C is a top isometric view of the light fixture 10*a* of FIG. 18A.

FIG. 19A is a bottom isometric view of a light fixture 10*a* with the extra-large light engine 20*e* of FIG. 9E mounted with the pole mounting adapter 18*a*, 18*b* of FIGS. 5A and 5B. FIG. 19B is a side view of the light fixture 10*a* of FIG. 19A. FIG. 19C is a top isometric view of the light fixture 10*a* of FIG. 19A.

FIG. 20A is a bottom isometric view of a light fixture 10*a* with the super-large light engine 20*f* of FIG. 9F mounted with the pole mounting adapter 18*a*, 18*b* of FIGS. 5A and 5B. FIG. 20B is a side view of the light fixture 10*a* of FIG. 20A. FIG. 20C is a top isometric view of the light fixture 10*a* of FIG. 20A.

B. Adjustable Fixtures

Figure 21A:
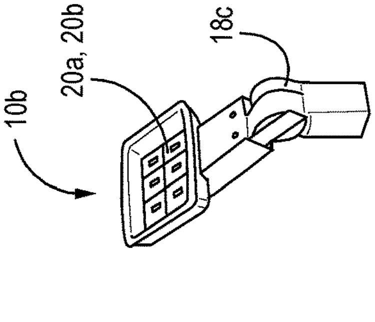
FIG. 21A is a top isometric view of a light fixture with the super-small light engine of FIG. 9A or the small light engine of FIG. 9B mounted with the adjustable mounting adapter of FIG. 5C.
Figure 21B:
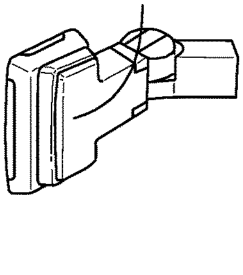
FIG. 21B is a bottom isometric view of the light fixture of FIG. 21A.
Figure 21C:
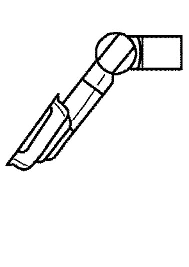
FIG. 21C is a side view of the light fixture of FIG. 21A.

FIG. 21A is a top isometric view of a light fixture 10*b* with the super-small light engine 20*a* of FIG. 9A or the small light engine 20*b* of FIG. 9B mounted with the adjustable mounting adapter 18*c* of FIG. 5C. FIG. 21B is a bottom isometric view of the light fixture 10*b* of FIG. 21A. FIG. 21C is a side view of the light fixture 10*b* of FIG. 21A.

Figure 22A:
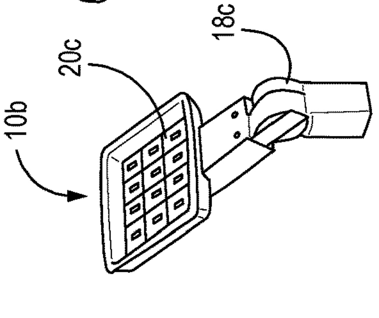
FIG. 22A is a top isometric view of a light fixture with the medium light engine of FIG. 9C mounted with the adjustable mounting adapter of FIG. 5C.
Figure 22B:
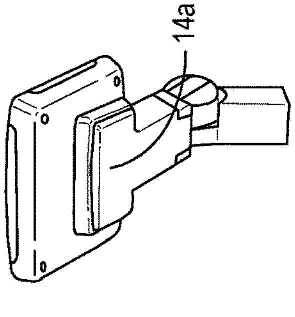
FIG. 22B is a bottom isometric view of the light fixture of FIG. 22A.
Figure 22C:
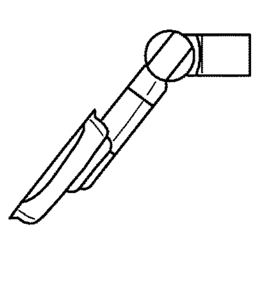
FIG. 22C is a side view of the light fixture of FIG. 22A.

FIG. 22A is a top isometric view of a light fixture 10*b* with the medium light engine 20*c* of FIG. 9C mounted with the adjustable mounting adapter 18*c* of FIG. 5C. FIG. 22B is a bottom isometric view of the light fixture 10*b* of FIG. 22A. FIG. 22C is a side view of the light fixture 10*b* of FIG. 22A.

Figure 23A:
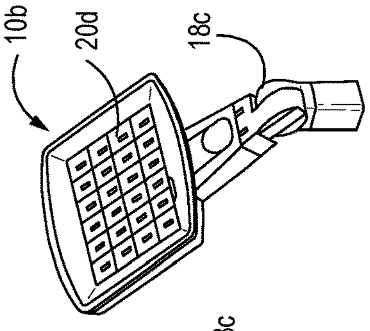
FIG. 23A is a top isometric view of a light fixture with the large light engine of FIG. 9D mounted with the adjustable mounting adapter of FIG. 5C.
Figure 23B:
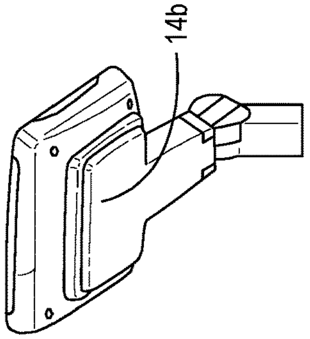
FIG. 23B is a bottom isometric view of the light fixture of FIG. 23A.
Figure 23C:
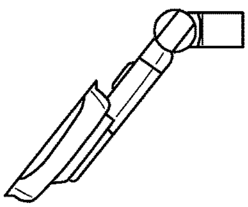
FIG. 23C is a side view of the light fixture of FIG. 23A.

FIG. 23A is a top isometric view of a light fixture 10*b* with the large light engine 20*d* of FIG. 9D mounted with the adjustable mounting adapter 18*c* of FIG. 5C. FIG. 23B is a bottom isometric view of the light fixture 10*b* of FIG. 23A. FIG. 23C is a side view of the light fixture 10*b* of FIG. 23A.

Figure 24A:
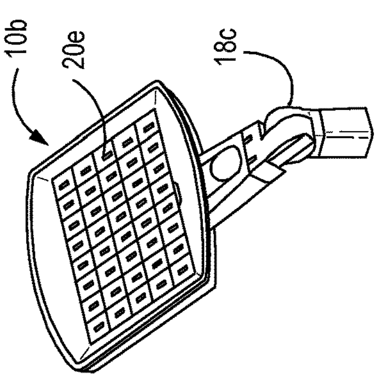
FIG. 24A is a top isometric view of a light fixture with the extra-large light engine of FIG. 9E mounted with the adjustable mounting adapter of FIG. 5C.
Figure 24B:
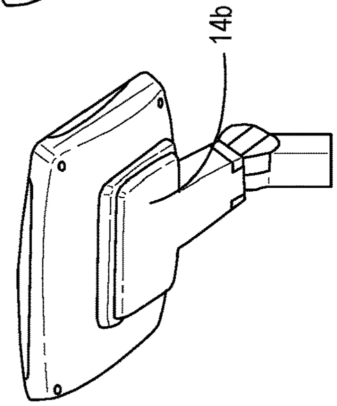
FIG. 24B is a bottom isometric view of the light fixture of FIG. 24A.
Figure 24C:
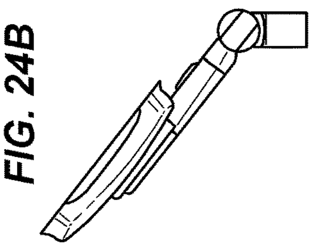
FIG. 24C is a side view of the light fixture of FIG. 24A.

FIG. 24A is a top isometric view of a light fixture 10*b* with the extra-large light engine 20*e* of FIG. 9E mounted with the adjustable mounting adapter 18*c* of FIG. 5C. FIG. 24B is a bottom isometric view of the light fixture 10*b* of FIG. 24A. FIG. 24C is a side view of the light fixture 10*b* of FIG. 24A.

Figure 25A:
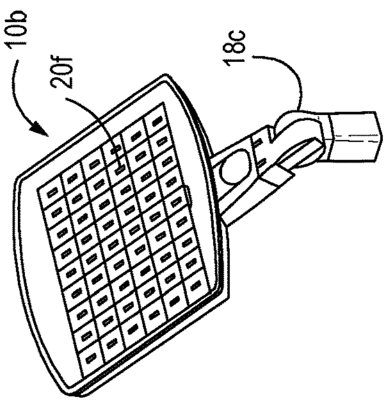
FIG. 25A is a top isometric view of a light fixture with the super-large light engine of FIG. 9F mounted with the adjustable mounting adapter of FIG. 5C.
Figure 25B:
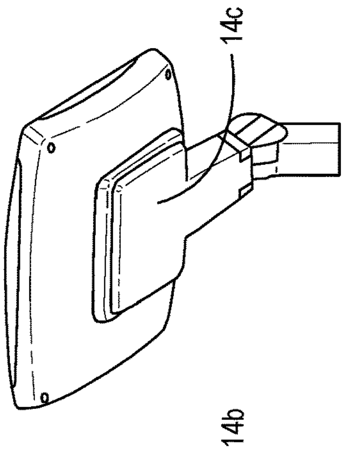
FIG. 25B is a bottom isometric view of the light fixture of FIG. 25A.
Figure 25C:
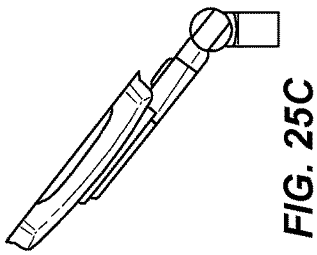
FIG. 25C is a side view of the light fixture of FIG. 25A.

FIG. 25A is a top isometric view of a light fixture 10*b* with the super-large light engine 20*f* of FIG. 9F mounted with the adjustable mounting adapter 18*c* of FIG. 5C. FIG. 25B is a bottom isometric view of the light fixture 10*b* of FIG. 25A. FIG. 25C is a side view of the light fixture 10*b* of FIG. 25A.

It should be understood that the embodiments of FIGS. 16A-25C are exemplary in nature and a number of different fixture types, mounting types, and lighting applications are contemplated within the present disclosure.

III. Installation of Light Fixtures

An example of an installation is described below with respect to a pole-mounted embodiment of the light fixture 10.

Figure 26B:
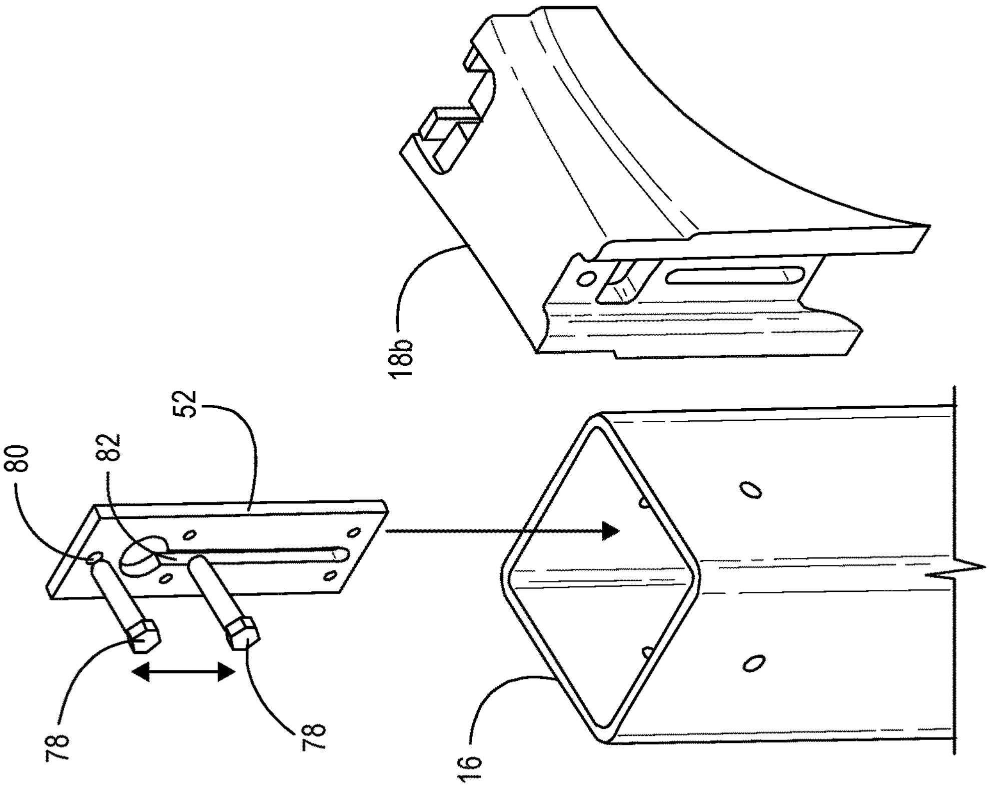
FIG. 26B illustrates attachment of the large pole mounting adapter of FIG. 5B to a pole.
Figure 26A:
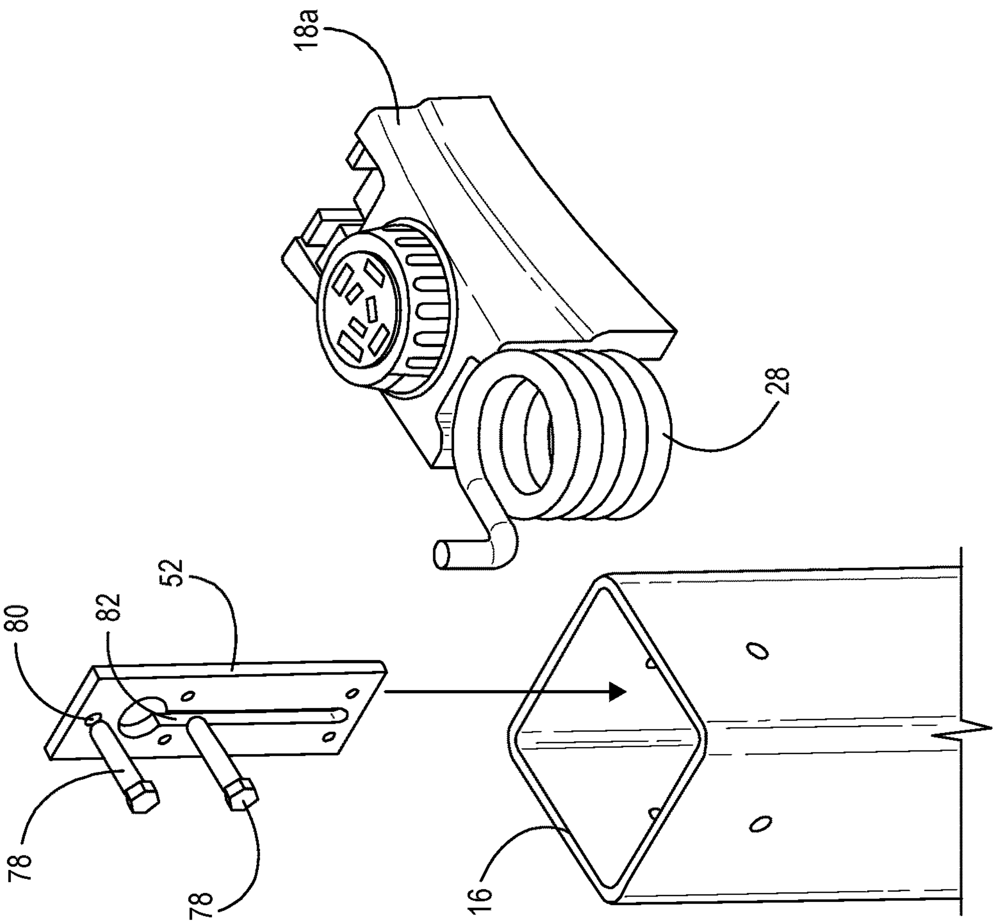
FIG. 26A illustrates attachment of the small pole mounting adapter of FIG. 5A to a pole.

FIG. 26A illustrates attachment of the small pole mounting adapter 18*a* of FIG. 5A to a pole 16. FIG. 26B illustrates attachment of the large pole mounting adapter 18*b* of FIG. 5B to a pole 16. For pole-mounting applications, the mounting adapter 18*a*, 18*b* can be attached to the pole 16 with the mounting bracket 52. In one aspect, the same mounting bracket 52 can be used for both the small pole mounting adapter 18*a* and the large pole mounting adapter 18*b*.

The mounting bracket 52 is placed inside the pole 16. Mounting bolts 78 or other fasteners extend through the mounting bracket 52, through openings in the pole 16, and into the small pole mounting adapter 18*a* or large pole mounting adapter 18*b*. The mounting bracket 52 includes a fixed mounting hole 80 and an adjustable mounting hole 82. Both mounting bolts 78 may attach to the small pole mounting adapter 18*a* at fixed points, but one mounting bolt 78 may attach to the large pole mounting adapter 18*b* at multiple points.

Figure 27B:
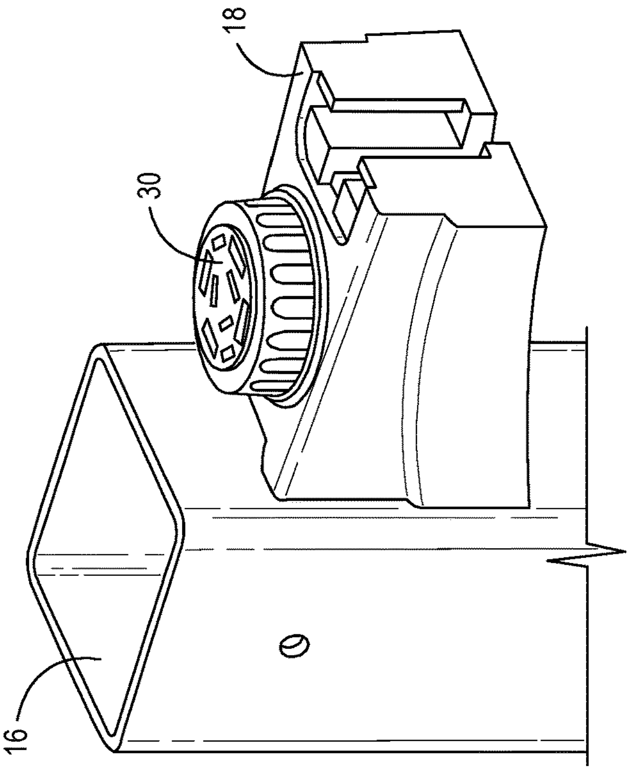
FIG. 27B illustrates the attached mounting adapter of FIG. 27A.
Figure 27A:
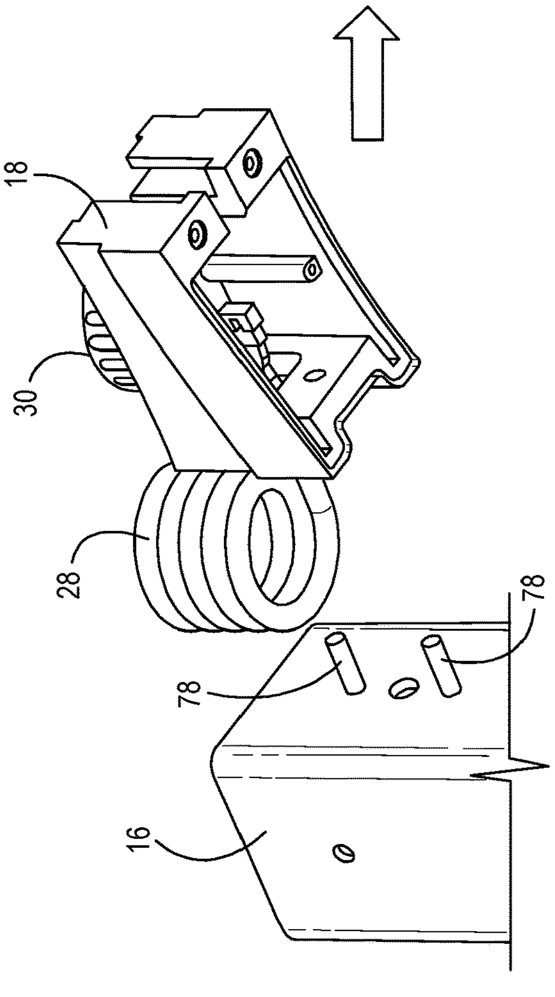
FIG. 27A illustrates attachment of the mounting adapter to a structure.

FIG. 27A illustrates attachment of the mounting adapter 18 to a structure. In this example, the mounting adapter 18 is attached to the pole 16. The mains power conductor 28 is fed through an opening in the pole 16 (e.g., between the mounting bolts 78) for connection to a line voltage, and the mounting adapter 18 is aligned with and attached to the mounting bracket 52 (not shown) with the mounting bolts 78. FIG. 27B illustrates the attached mounting adapter 18 of FIG. 27A.

Figure 27D:
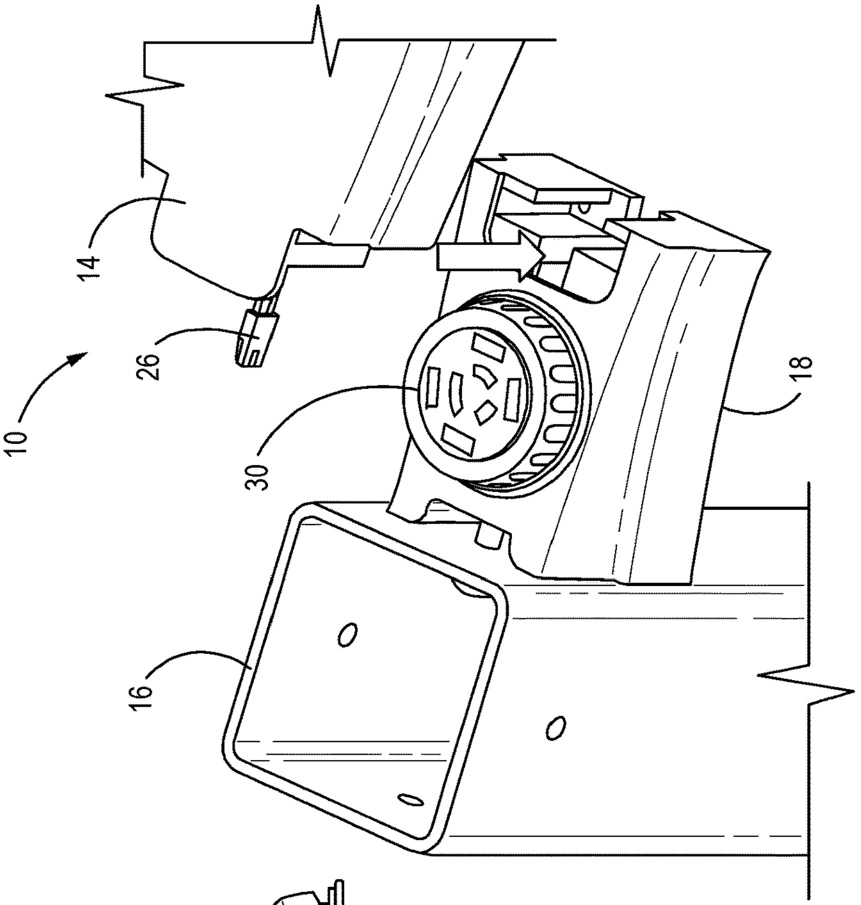
FIG. 27D is a top isometric side view illustrating attachment of the light fixture to the mounting adapter of FIG. 27C.
Figure 27C:
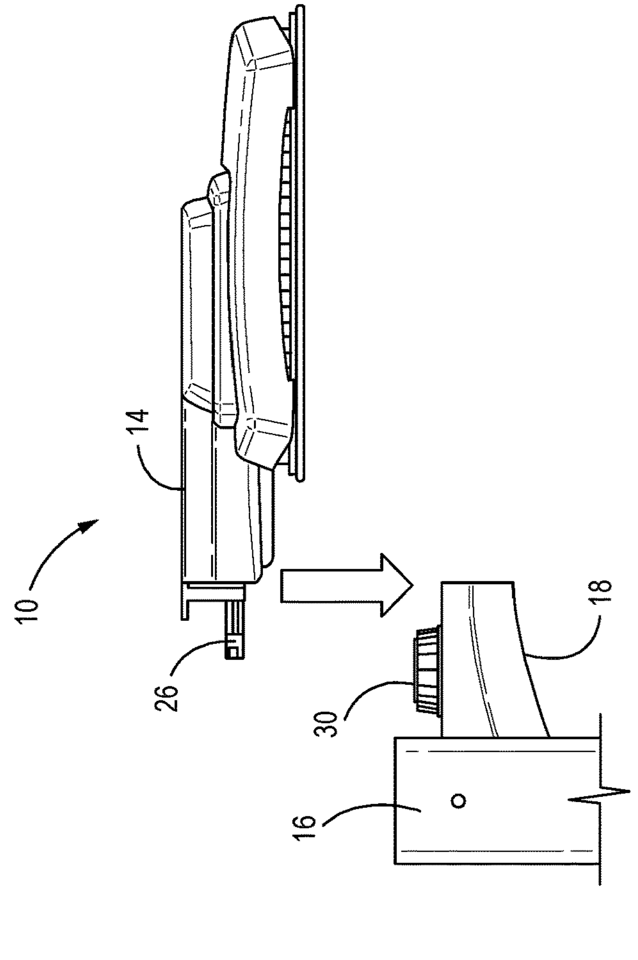
FIG. 27C is a side view illustrating attachment of the light fixture to the mounting adapter of FIG. 27B.

FIG. 27C is a side view illustrating attachment of the light fixture 10 to the mounting adapter 18 of FIG. 27B. FIG. 27D is a top isometric side view illustrating attachment of the light fixture 10 to the mounting adapter 18 of FIG. 27C. The light fixture 10 is attached to the mounting adapter 18 at an end of the main fixture housing 14 by sliding the keyhole-type interlocking structure of the main fixture housing 14 onto corresponding structure on the mounting adapter 18.

Figure 27E:
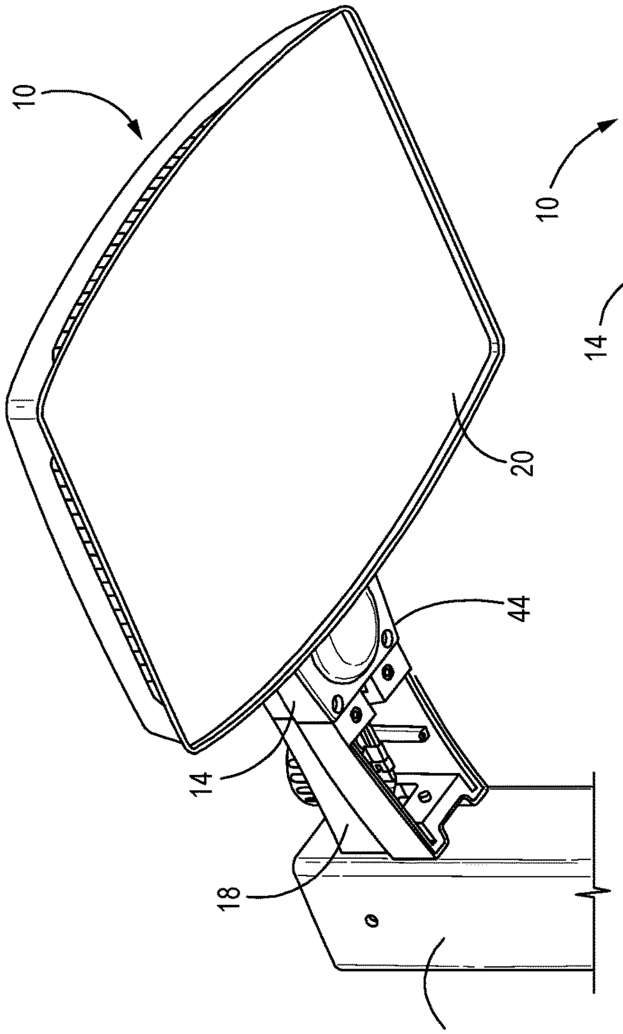
FIG. 27E is a bottom isometric view of the light fixture attached to the mounting adapter of FIG. 27D.
Figure 27G:
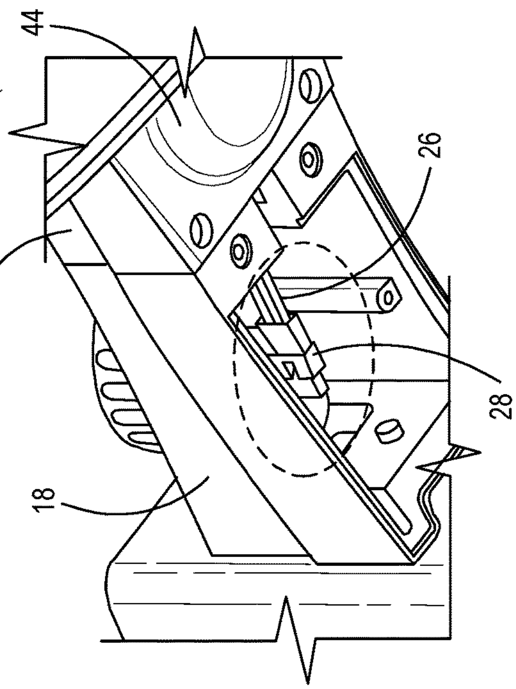
FIG. 27G is a bottom isometric view of the mounting adapter and light fixture of FIG. 27F illustrating connection of the fixture power connector to the mains power conductor.
Figure 27F:
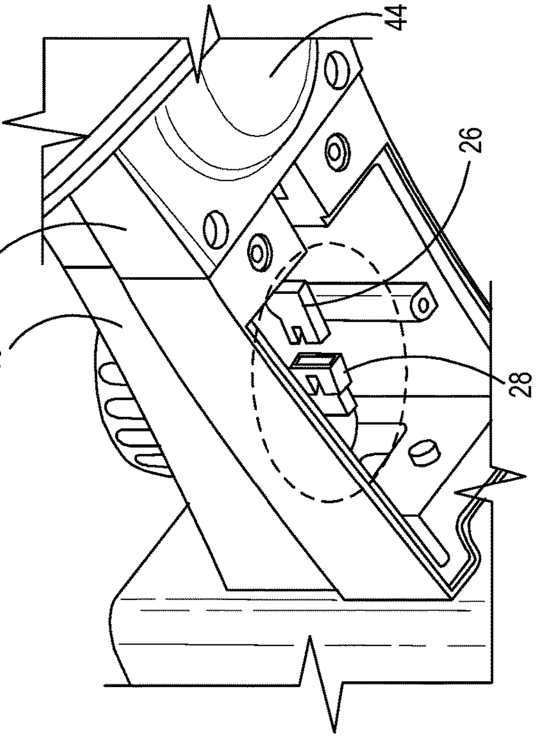
FIG. 27F is a bottom isometric view of the mounting adapter and light fixture of FIG. 27E illustrating a fixture power connector and mains power conductor.

FIG. 27E is a bottom isometric view of the light fixture 10 attached to the mounting adapter 18 of FIG. 27D. FIG. 27F is a bottom isometric view of the mounting adapter 18 and light fixture 10 of FIG. 27E illustrating the fixture power connector 26 and mains power conductor 28. After attaching the main fixture housing 14 to the mounting adapter 18, the fixture power connector 26 is attached to the mains power conductor 28. FIG. 27G is a bottom isometric view of the mounting adapter 18 and light fixture 10 of FIG. 27F illustrating connection of the fixture power connector 26 to the mains power conductor 28.

Figure 27I:
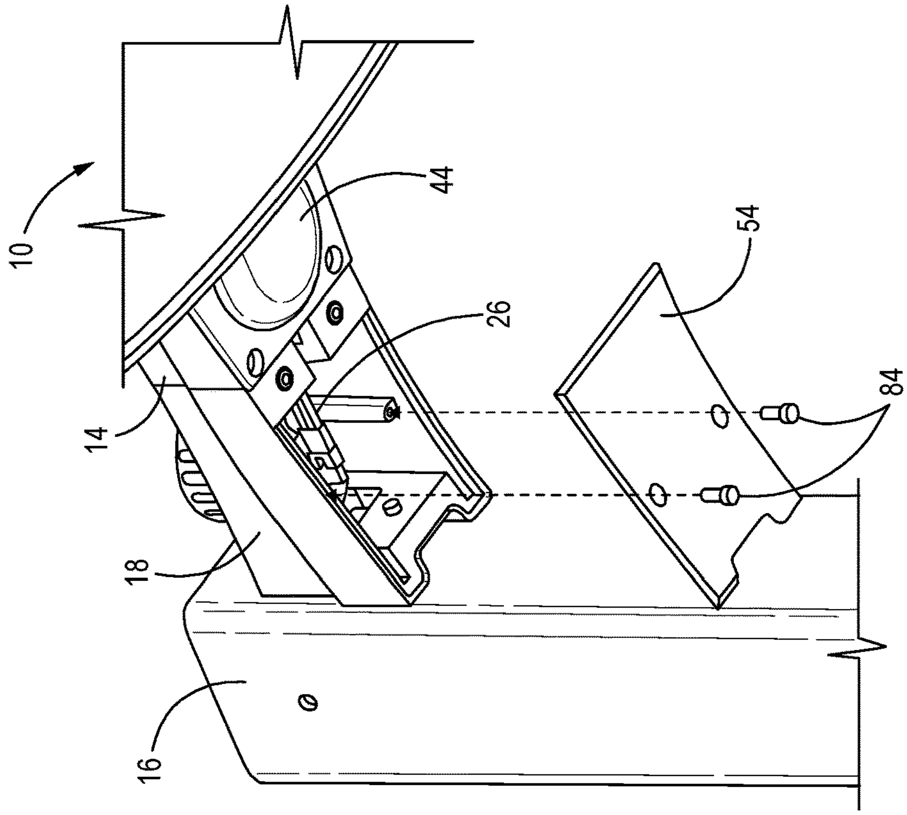
FIG. 27I illustrates securing a mounting adapter cover to the mounting adapter of FIG. 27H with fasteners.
Figure 27H:
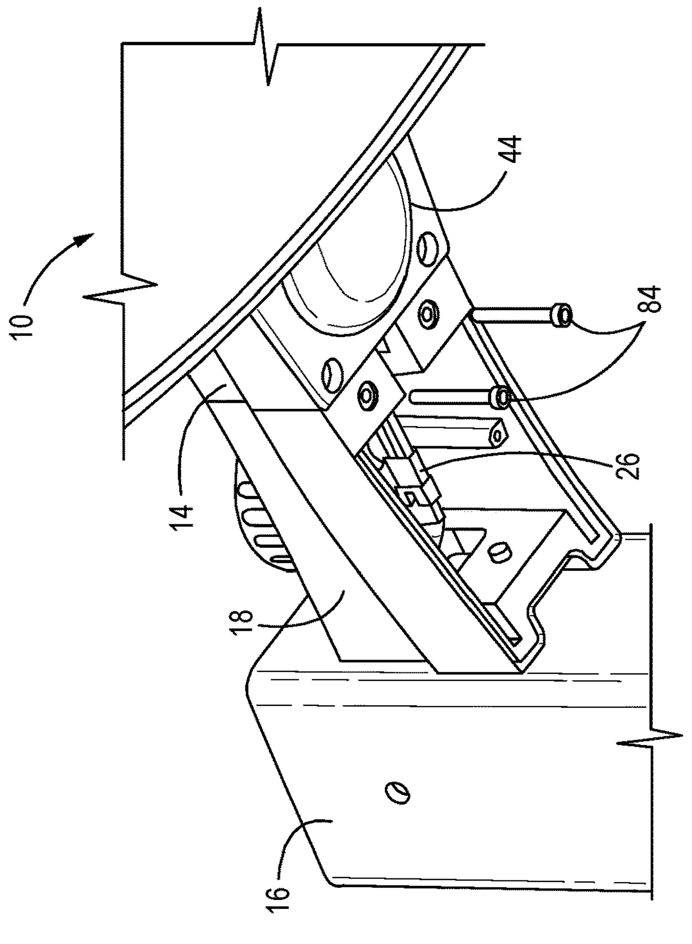
FIG. 27H illustrates securing the light fixture to the mounting adapter of FIG. 27G with fasteners.

FIG. 27H illustrates securing the light fixture 10 to the mounting adapter 18 of FIG. 27G with fasteners 84. FIG. 27I illustrates securing the mounting adapter cover 54 to the mounting adapter 18 of FIG. 27H with fasteners 84. The fasteners 84 may be bolts, screws, or other mechanical means of securing these components. The fasteners 84 used for the mounting adapter cover 54 may be different (e.g., smaller and/or another type) from the fasteners 84 used to secure the light fixture 10 to the mounting adapter 18. In some embodiments, the mounting adapter cover 54 may be attached without fasteners 84, such as via snap-fit.

Figure 27J:
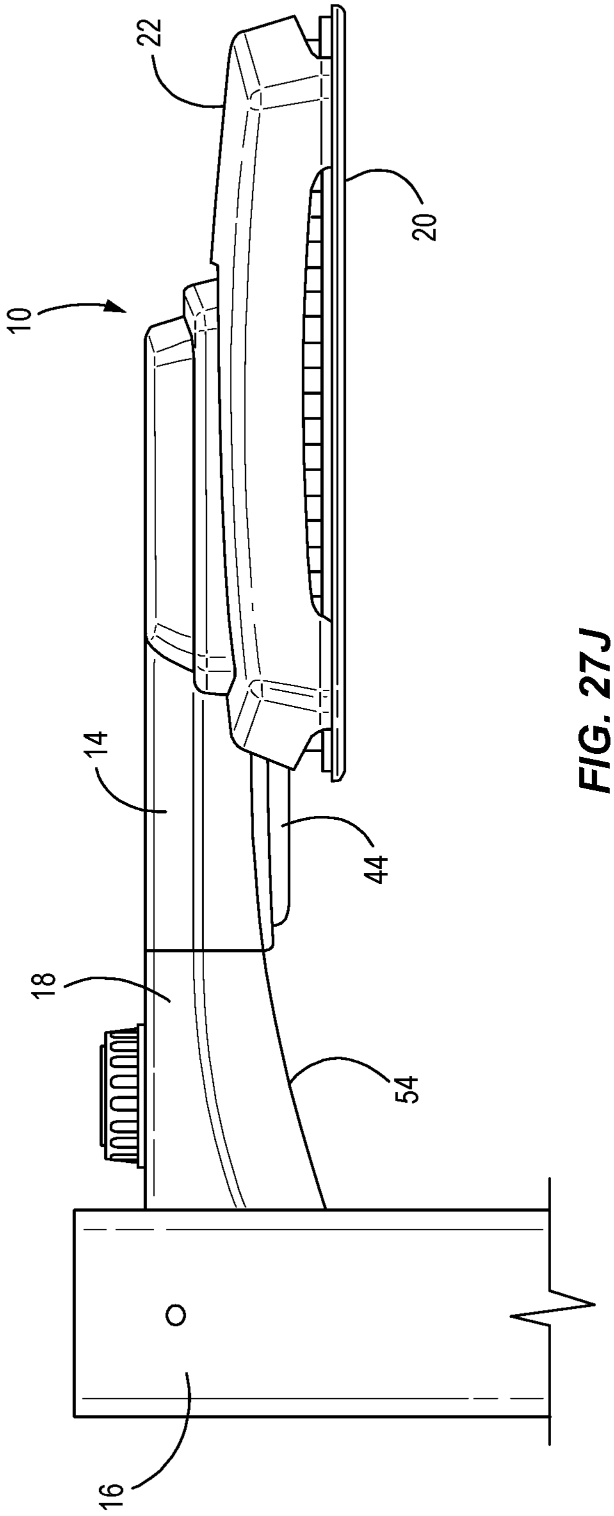
FIG. 27J is a side view of the installed light fixture of FIG. 27I.

FIG. 27J is a side view of the installed light fixture 10 of FIG. 27I.

IV. Servicing of Light Fixtures

Figure 28B:
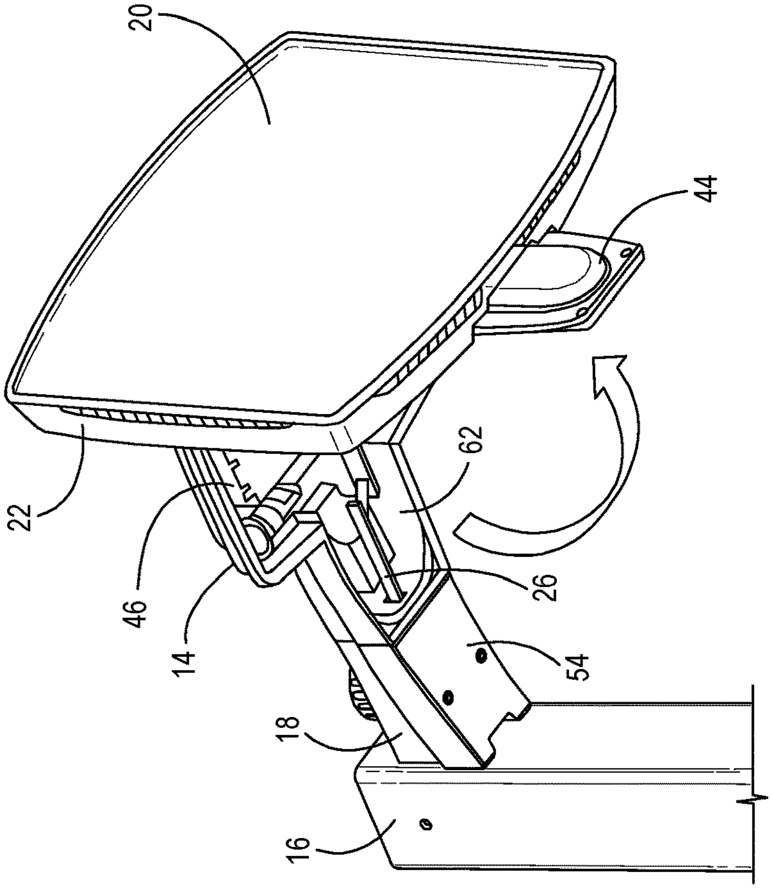
FIG. 28B illustrates pivoting of the light engine of FIG. 28A for servicing of components in the main fixture housing.
Figure 28A:
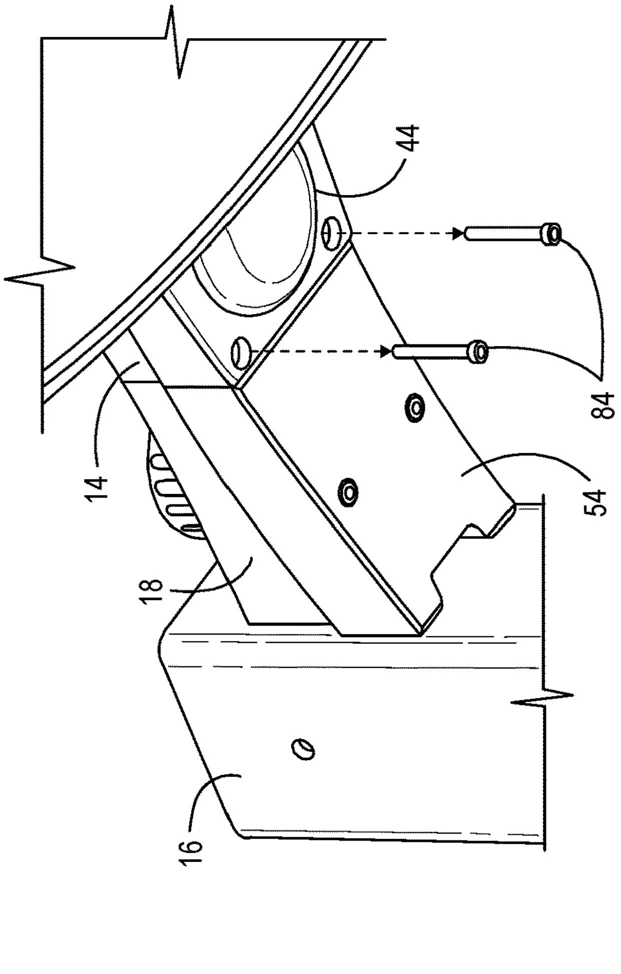
FIG. 28A illustrates removal of fasteners for the bottom cover of the main fixture housing for servicing of the light fixture.

FIG. 28A illustrates removal of fasteners 84 for the bottom cover of the main fixture housing 14 for servicing of the light fixture 10. FIG. 28B illustrates pivoting of the light engine 20 of FIG. 28A for servicing of components in the main fixture housing 14. The optical assembly 22 is pivotably attached to the main fixture housing 14 via the hinge 56 at a first end of the main fixture housing 14. The optical assembly 22 is further attached to the main fixture housing 14 at a second end opposite the first end via the fasteners 84. In particular, the bottom cover 44 of the main fixture housing 14 is affixed to the optical assembly 22 and the fasteners 84 attach the bottom cover 44 to the upper portion of the main fixture housing 14. Thus, by removing the fasteners 84, the optical assembly 22 can pivot downward to facilitate access to the power circuitry 46 and other components in the weather-sealed compartment 62.

Figure 28C:
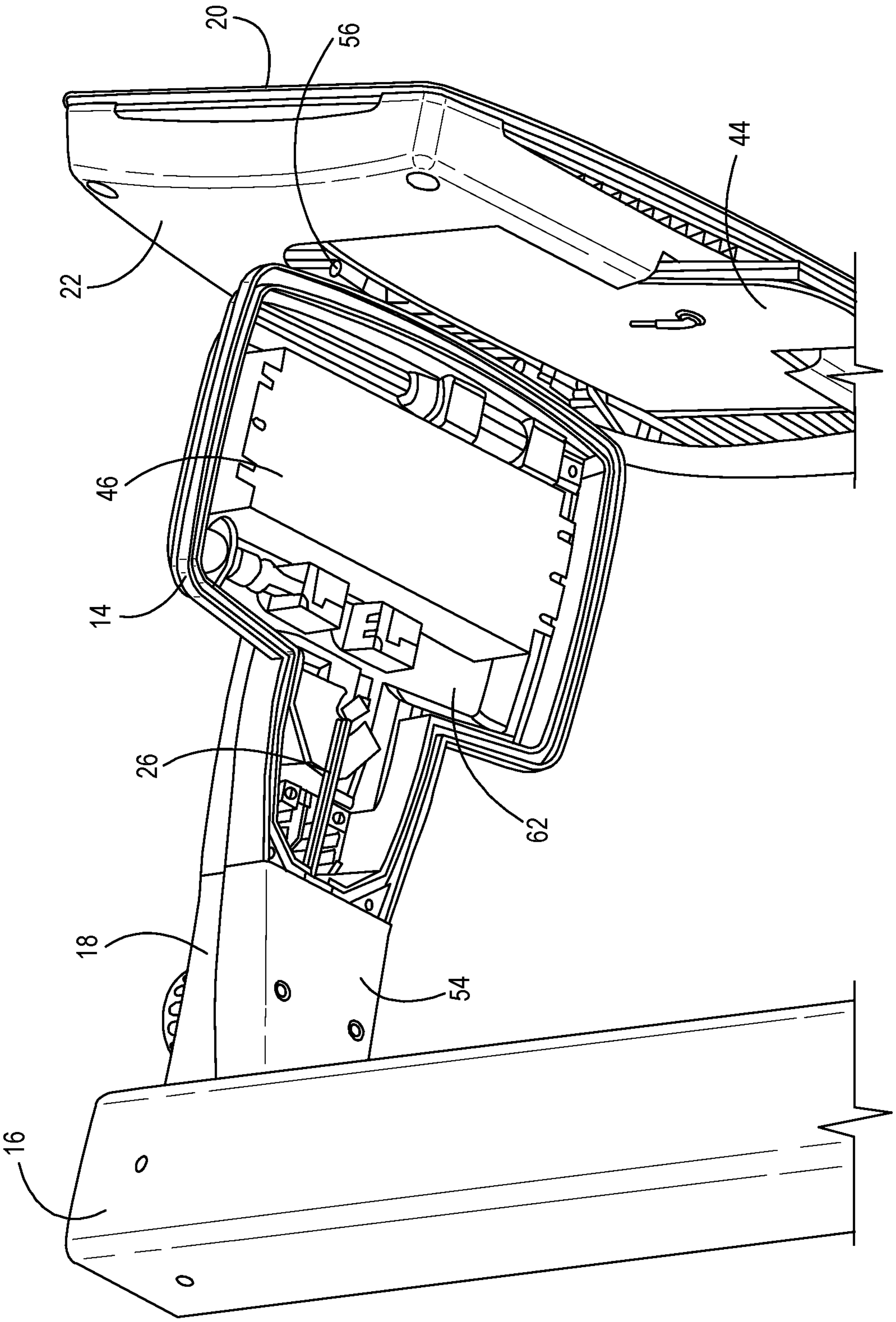
FIG. 28C illustrates the main fixture housing of FIG. 28B open for servicing of components without removing the light engine.

FIG. 28C illustrates the main fixture housing 14 of FIG. 28B open for servicing of components without removing the light engine 20. Note that it is also not necessary to remove any fasteners 84 from the mounting adapter cover 54. In some embodiments, the optical assembly 22 can be opened without the use of tools. For example, the fasteners 84 may be tool-less fasteners 84, or the optical assembly 22 may be attached to the main fixture housing 14 without fasteners 84 (e.g., via snap-fit).

The hinge 56 can be an appropriate hinge which facilitates a weather seal when the main fixture housing 14 is closed and allows for easy service access. The hinge 56 may be a two-part hinge, with a first part attached to or formed on the main fixture housing 14 and a second part attached to or formed on the optical assembly 22.

Figure 28D:
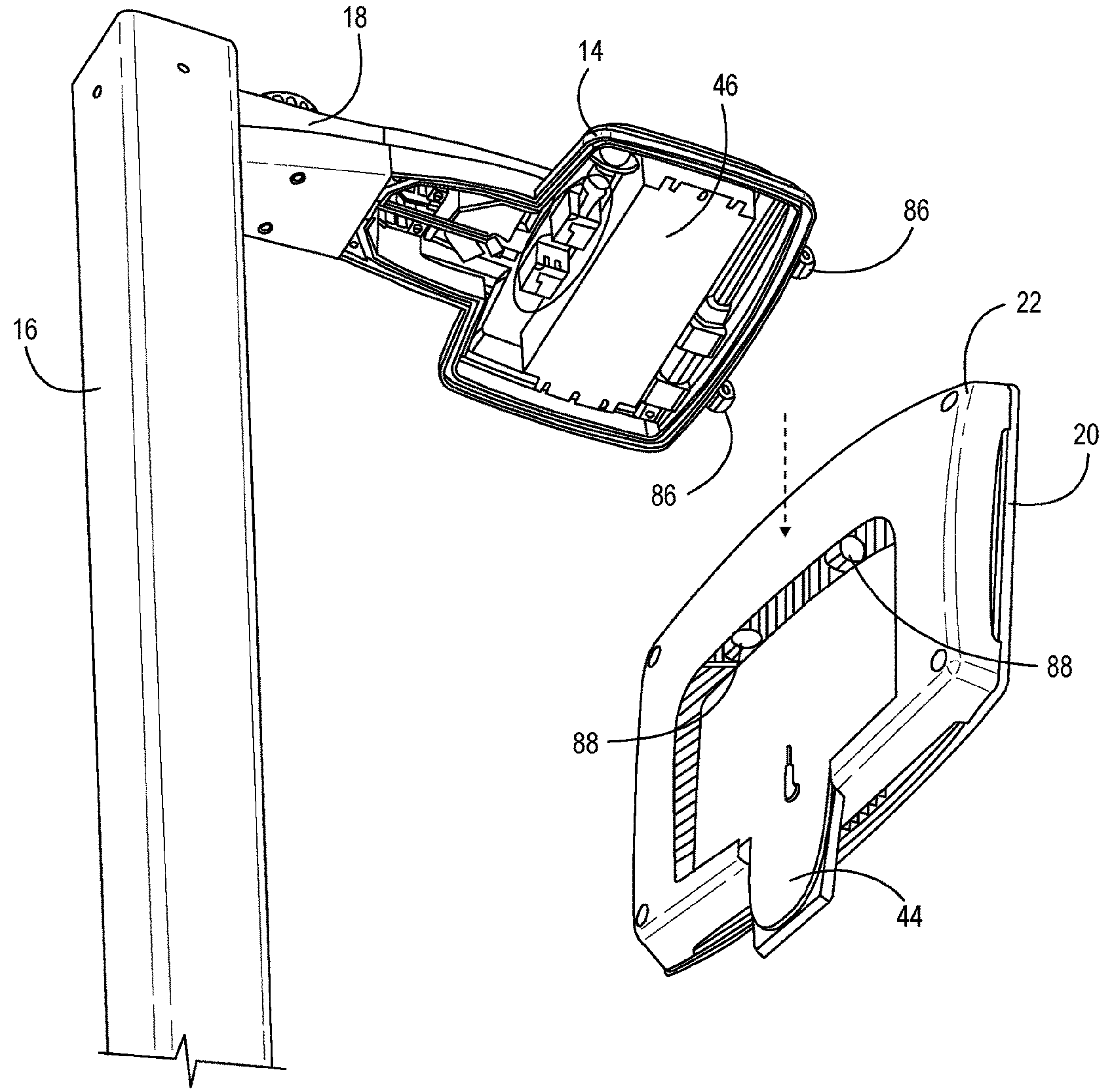
FIG. 28D illustrates removal of the light engine from the main fixture housing of FIG. 28C.

FIG. 28D illustrates removal of the light engine 20 from the main fixture housing 14 of FIG. 28C. In addition to facilitating easy access to the weather-sealed compartment 62, the hinge 56 can provide for tool-less removal of the optical assembly 22 from the main fixture housing 14. For example, the hinge 56 can include one or more first hinge components 86 attached to the main fixture housing 14 and one or more second hinge components 88 attached to the light engine 20.

In particular, the first hinge component(s) 86 may be formed integral with the main fixture housing 14. A relief may be opened in at least one of the first hinge components 86 to allow for the second hinge components 88 to be decoupled from the first hinge components 86 without tools. The second hinge component(s) 88 may similarly be formed integral with the heat sink 24. The bottom cover 44 of the main fixture housing 14 is further affixed to the optical assembly 22 via attachment to the heat sink 24.

Those skilled in the art will recognize improvements and modifications to the preferred embodiments of the present disclosure. All such improvements and modifications are considered within the scope of the concepts disclosed herein and the claims that follow.

What is claimed is:

1. A light fixture, comprising:

a housing enclosing power circuitry for at least one light emitter; and a light engine comprising the at least one light emitter and being pivotably connected to the housing, wherein when the light engine pivots from a first position blocking access into the housing to a second position allowing service access to at least one component of the power circuitry within the housing, and the light engine remains weather-sealed and secured with respect to the housing while in the second position.

2. The light fixture of claim 1, wherein the light engine is pivotably attached via a hinge at a first end of the housing.

3. The light fixture of claim 2, wherein the light engine is further attached to the housing via a fastener adjacent a second end opposite the first end.

4. The light fixture of claim 3, wherein the fastener adjacent the second end is removable to facilitate access to the power circuitry without detaching the light engine.

5. The light fixture of claim 2, wherein the hinge comprises a first hinge component attached to the housing and a second hinge component attached to the light engine.

6. The light fixture of claim 5, wherein the first hinge component and the second hinge component can be coupled and decoupled without tools.

7. The light fixture of claim 1, wherein the light engine is replaceable with a second light engine comprising a larger array of light emitters without replacing the main fixture housing.

8. The light fixture of claim 7, wherein the light engine is replaceable with the second light engine without replacing the power circuitry.

9. The light fixture of claim 1, further comprising an outdoor power outlet connected to the power circuitry and disposed on an outer surface of the light fixture.

10. The light fixture of claim 1, wherein the at least one component comprises replaceable power circuitry, wherein the replaceable power circuitry is replaceable within the housing while the light engine is in the second position to support a replacement light engine of a different size than the light engine without replacing the housing.

11. A light fixture, comprising:

a fixture housing enclosing power circuitry; and a light-emitting arrangement operatively connected to the power circuitry and being pivotably connected to the fixture housing, wherein when the light-emitting arrangement pivots from a first position blocking access into the fixture housing to a second position allowing service access to at least one component of the power circuitry, and wherein the light-emitting arrangement remains weather-sealed and secured with respect to the housing while in the second position.

12. The light fixture of claim 11, wherein the fixture housing comprises an upper portion and a lower portion defining a compartment enclosing the power circuitry.

13. The light fixture of claim 12, wherein the lower portion of the fixture housing is attached to the light-emitting arrangement such that the power circuitry is serviceable without detaching the light-emitting arrangement.

14. The light fixture of claim 11, further comprising a light engine comprising:

a heat sink; and the light-emitting arrangement coupled to the heat sink.

15. The light fixture of claim 14, further comprising a cowling attached to the light engine and defining a thermal passage between the cowling and the heat sink.

16. The light fixture of claim 15 , wherein the cowling comprises a thermal intake opening at a bottom edge of the light engine and a thermal exhaust opening at a top edge of the light engine adjacent the fixture housing.

17. The light fixture of claim 11, wherein the fixture housing is configured to be mounted to a structure.

18. The light fixture of claim 17, further comprising a first mounting adapter attached to the fixture housing and configured to mount to the structure in a first orientation.

19. The light fixture of claim 18, wherein the first mounting adapter is replaceable with a second mounting adapter configured to mount to the structure in a second orientation.

20. The light fixture of claim 18, wherein the first mounting adapter comprises an outdoor power outlet electrically connected to the power circuitry and disposed on an outer surface of the light fixture.

* * * * *